US010176524B1

(12) United States Patent
Brandmaier et al.

(10) Patent No.: US 10,176,524 B1
(45) Date of Patent: Jan. 8, 2019

(54) VEHICLE-TO-VEHICLE INCIDENT INFORMATION COLLECTION

(71) Applicant: Allstate Insurance Company, Northbrook, IL (US)

(72) Inventors: Jennifer A. Brandmaier, Chicago, IL (US); Martin Higgins, Downpatrick (GB); William Loo, Arlington Heights, IL (US); Christopher G. Plachta, Glenview, IL (US); Philip Peter Ramirez, Arlington Heights, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 14/922,914

(22) Filed: Oct. 26, 2015

(51) Int. Cl.
*G06Q 40/08* (2012.01)
*G07C 5/00* (2006.01)
*G07C 5/02* (2006.01)

(52) U.S. Cl.
CPC ............. *G06Q 40/08* (2013.01); *G07C 5/008* (2013.01); *G07C 5/02* (2013.01)

(58) Field of Classification Search
CPC ........... G06Q 40/08; G07C 5/008; G07C 5/02
See application file for complete search history.

(56) References Cited

U.S. PATENT DOCUMENTS

| 7,579,942 | B2 | 8/2009 | Kalik |
| 8,799,034 | B1 | 8/2014 | Brandmaier et al. |
| 9,147,353 | B1* | 9/2015 | Slusar .................. G09B 19/167 |
| 9,293,042 | B1* | 3/2016 | Wasserman ............ G07C 5/006 |
| 9,355,423 | B1* | 5/2016 | Slusar .................... G06Q 40/08 |
| 9,390,451 | B1* | 7/2016 | Slusar .................... G06Q 40/04 |
| 2009/0033540 | A1 | 2/2009 | Breed et al. |
| 2010/0052945 | A1 | 3/2010 | Breed |
| 2010/0100324 | A1 | 4/2010 | Caminiti et al. |
| 2010/0131304 | A1* | 5/2010 | Collopy ............. G06Q 30/0224 |
| | | | 705/4 |
| 2013/0218604 | A1 | 8/2013 | Hagelstein et al. |
| 2013/0238181 | A1 | 9/2013 | James |
| 2014/0302774 | A1* | 10/2014 | Burke .................... H04H 20/57 |
| | | | 455/3.05 |

(Continued)

FOREIGN PATENT DOCUMENTS

| WO | 9815845 A1 | 4/1998 |
| WO | 2015160859 A1 | 10/2015 |
| WO | WO 2015160859 A1 * | 10/2015 ......... G06Q 30/0266 |

OTHER PUBLICATIONS

AACN Report, Center for Disease Control and Prevention, dated 2008.

*Primary Examiner* — Jeffrey C Boomer
(74) *Attorney, Agent, or Firm* — Banner & Witcoff, Ltd.

(57) ABSTRACT

One or more driving analysis computing devices in a driving analysis system may be configured to collect vehicle driving data and infrastructure data in response to a collision. Vehicle driving data may be received from a first vehicle involved in the collision and a second vehicle involved in the collision. Vehicle driving data may be received for vehicles within a defined radius of the first vehicle and/or the second vehicle. Infrastructure data from infrastructure elements within a defined vicinity of the first vehicle and/or the second vehicle may be received. The received data may be used to initiate an insurance claim, assess fault for the collision, and detect fraudulent claims.

18 Claims, 9 Drawing Sheets

(56) References Cited

U.S. PATENT DOCUMENTS

| | | | |
|---|---|---|---|
| 2015/0084757 A1 | 3/2015 | Annibale et al. | |
| 2015/0112543 A1* | 4/2015 | Binion | G07C 5/085 |
| | | | 701/32.2 |
| 2015/0112731 A1* | 4/2015 | Binion | G06Q 40/08 |
| | | | 705/4 |
| 2015/0145695 A1 | 5/2015 | Hyde et al. | |
| 2015/0149218 A1 | 5/2015 | Bayley et al. | |
| 2016/0119419 A1* | 4/2016 | Choi | B60K 35/00 |
| | | | 701/36 |
| 2016/0212596 A1* | 7/2016 | Brahmi | H04L 67/12 |
| 2016/0275790 A1* | 9/2016 | Kang | G06K 9/00791 |
| 2016/0277911 A1* | 9/2016 | Kang | H04W 4/22 |
| 2016/0295589 A1* | 10/2016 | Nikopour | H04W 4/023 |
| 2017/0015263 A1* | 1/2017 | Makled | B60R 21/00 |
| 2017/0017734 A1* | 1/2017 | Groh | G06F 17/5009 |
| 2017/0032402 A1* | 2/2017 | Patsiokas | G06Q 30/0266 |
| 2017/0039848 A1* | 2/2017 | Hakeem | G08G 1/052 |
| 2017/0190331 A1* | 7/2017 | Gupta | B60Q 1/346 |
| 2017/0287233 A1* | 10/2017 | Nix | G07C 5/008 |
| 2018/0005460 A1* | 1/2018 | Alieiev | G07C 5/008 |

\* cited by examiner

VEHICLE-TO-VEHICLE INCIDENT INFORMATION COLLECTION

TECHNICAL FIELD

Aspects of the disclosure generally relate to the analysis of vehicle driving data. In particular, various aspects of the disclosure relate to transmitting, receiving, and processing vehicle driving data related to a collision or an incident of dangerous driving behavior via vehicle-to-vehicle communication.

BACKGROUND

Many vehicles include sophisticated sensors and advanced internal computer systems designed to monitor and control vehicle operations and driving functions. Vehicle-based computer systems, such as on-board diagnostics (OBD) systems and telematics devices, may be used in automobiles and other vehicles, and may be capable of collecting various driving data and vehicle sensor data. For example, OBD systems may receive information from the vehicle's on-board computers and sensors in order to monitor a wide variety of information relating to the vehicle systems, such as engine RPM, emissions control, vehicle speed, throttle position, acceleration and braking rates, use of driver controls, etc. Vehicles may also include Global Positioning System (GPS) receivers and devices installed within or operating at the vehicle configured to collect vehicle location and time data.

However, not all vehicles are equipped with systems capable of collecting, analyzing, and communicating driving data. In contrast to vehicle-based systems, mobile devices such as smartphones, personal digital assistants, tablet computers, and the like, are often carried and/or operated by a single user. Some mobile devices may include movement sensors, such as an accelerometer, gyroscope, speedometer, and/or GPS receivers, capable of detecting movement.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to detecting, by a driving analysis computing device, a collision between a first vehicle and a second vehicle. The driving analysis computing device may receive, from the first vehicle, first vehicle driving data collected by first vehicle operation sensors within the first vehicle. The driving analysis computing device may receive, from the second vehicle, second vehicle driving data collected by second vehicle operations sensors within the second vehicle. The driving analysis computing device may transmit, to a third vehicle within a first radius of the first vehicle and via a first vehicle-to-vehicle (V2V) communication, a first request for vehicle driving data. The driving analysis computing device may receive, from the third vehicle and via a second V2V communication, third vehicle driving data collected by third vehicle operation sensors within the third vehicle. The driving analysis computing device may transmit the first vehicle driving data, the second vehicle driving data, and the third vehicle driving data to a server. An insurance claim may be initiated based on the transmitted first vehicle driving data, second vehicle driving data, and third vehicle driving data.

In accordance with further aspects of the present disclosure, the driving analysis computing device may transmit, to the third vehicle and via a third V2V communication, a second request for vehicle driving data for one of more vehicles that are within a second radius of the third vehicle, and may receive, in response to the second request and by the third vehicle, fourth vehicle driving data collected by fourth vehicle operations sensors within a fourth vehicle that is within the second radius of the third vehicle. The driving analysis computing device may receive, from the third vehicle and via a fourth V2V communication, the fourth vehicle driving data, and may transmit the fourth vehicle driving data to the server. The driving analysis computing device may transmit the fourth vehicle driving data to the server via a telematics device.

In accordance with further aspects of the present disclosure, the driving analysis computing device may determine a time frame associated with the collision between the first vehicle and the second vehicle, transmit, to one or more infrastructure elements within a second radius of the first vehicle, and via a first vehicle-to-infrastructure ("V2I") communication, a request for image files for the time frame, receive, from one or more infrastructure elements and via a second V2I communications image files associated with the time frame, tag the image files with a collision identification number associated with the collision between the first vehicle and the second vehicle, and transmit the tagged image files to the server. In accordance with further aspects of the present disclosure, the driving analysis computing device may transmit, to the third vehicle and via a third V2V communication, a second request for image files from infrastructure elements that are within a second radius of the third vehicle, transmit, by the third vehicle, to one or more infrastructure elements that are within the second radius of the third vehicle, a first vehicle-to-infrastructure ("V2I") communication requesting image files, and receive, by the third vehicle and from the one or more infrastructure elements, a second V2I communication comprising the requested image files. The driving analysis computing device may receive the image files from the third vehicle and via a fourth V2V communication. The driving analysis computing device may transmit the image files received from the third vehicle to a server.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
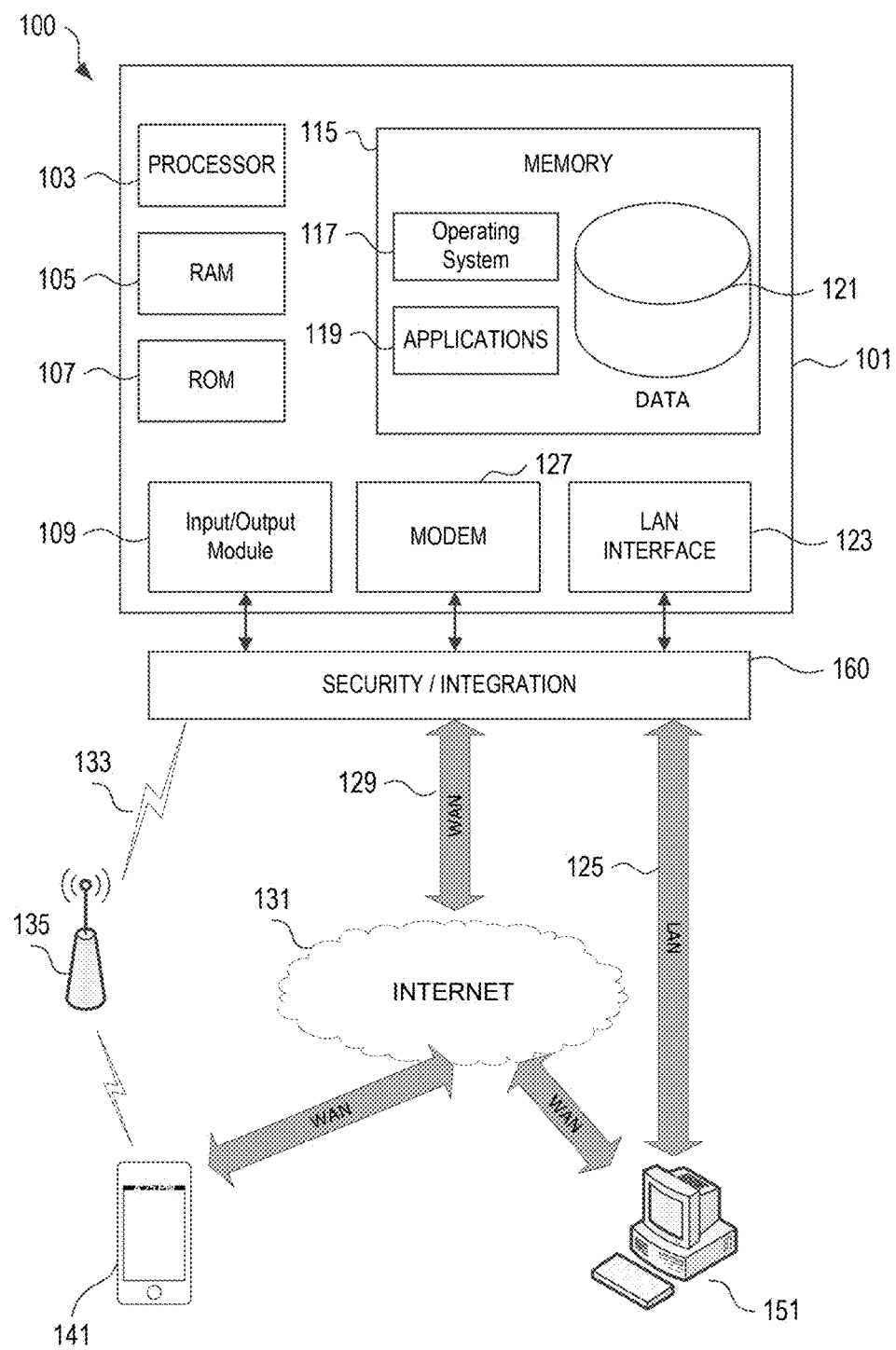
FIG. 1 illustrates a network environment and computing systems that may be used to implement aspects of the disclosure.

FIG. 1 illustrates a block diagram of a driving analysis computing device 101 in accident prevention, detection and recovery system 100 that may be used according to one or more illustrative embodiments of the disclosure. The driving analysis device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as a driving analysis computing devices or systems, configured as described herein for transmitting and receiving vehicle-to-vehicle (V2V) communications, analyzing vehicle driving data, detecting dangerous driving behaviors, detecting imminent collisions, detecting collisions, and collecting vehicle driving data based on the V2V communications.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the driving analysis system 101 to execute a series of computer-readable instructions to transmit or receive vehicle driving data, analyze driving data and identify driving behaviors, and calculate driver scores.

The driving analysis computing device 101 may operate in a networked environment supporting connections to one or more remote computers, such as terminals/devices 141 and 151. Driving analysis computing device 101, and related terminals/devices 141 and 151, may include devices installed in vehicles, mobile devices that may travel within vehicles, or devices outside of vehicles that are configured to receive and process vehicle and driving data. Thus, the driving analysis computing device 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the driving analysis computing device 101.

The network connections depicted in FIG. 1 include a local area network (LAN) 125 and a wide area network (WAN) 129, and a wireless telecommunications network 133, but may also include other networks. When used in a LAN networking environment, the driving analysis computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133. It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Also illustrated in FIG. 1 is a security and integration layer 160, through which communications may be sent and managed between the device 101 (e.g., a user's personal mobile device, a vehicle-based system, an accident detection and recovery server or other external server, etc.) and the remote devices (141 and 151) and remote networks (125, 129, and 133). The security and integration layer 160 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 160 of a mobile computing device, vehicle-based device, or a server operated by an insurance provider, financial institution, governmental entity, or other organization, may comprise a set of web application servers configured to use secure protocols and to insulate the server 101 from external devices 141 and 151. In some cases, the security and integration layer 160 may correspond to a set of dedicated hardware and/or software operating at the same physical location and under the control of same entities as driving data analysis server 101. For example, layer 160 may correspond to one or more dedicated web servers and network hardware in an organizational datacenter or in a cloud infrastructure supporting a cloud-based driving data analysis system. In other examples, the security and integration layer 160 may correspond to separate hardware and software components which may be operated at a separate physical location and/or by a separate entity.

As discussed below, the data transferred to and from various devices in accident prevention, detection and recovery system 100 may include secure and sensitive data, such as driving data, driving locations, vehicle data, and confidential individual data such as insurance data and medical data associated with vehicle occupants. In at least some examples, transmission of the data may be performed based on one or more user permissions provided. Therefore, it may be desirable to protect transmissions of such data by using secure network protocols and encryption, and also to protect the integrity of the data when stored on in a database or other storage in a mobile device, driving data analysis server, or other computing devices in accident prevention, detection and recovery system 100, by using the security and integration layer 160 to authenticate users and restrict access to unknown or unauthorized users. In various implementations, security and integration layer 160 may provide, for example, a file-based integration scheme or a service-based integration scheme for transmitting data between the various devices in the accident prevention, detection and recovery system 100. Data may be transmitted through the security and integration layer 160, using various network communication protocols. Secure data transmission protocols and/or encryption may be used in file transfers to protect to integrity of the driving data, for example, File Transfer Protocol (FTP), Secure File Transfer Protocol (SFTP), and/or Pretty Good Privacy (PGP) encryption. In other examples, one or more web services may be implemented within the various devices 101 in accident prevention, detection and recovery system 100 and/or the security and integration layer 160. The web services may be accessed by authorized external devices and users to support input, extraction, and manipulation of the data (e.g., driving data, location data, confidential personal data, etc.) between the various devices 101 in the accident prevention, detection and recovery system 100. Web services built to support accident prevention, detection and recovery system 100 may be cross-domain and/or cross-platform, and may be built for enterprise use. Such web services may be developed in accordance with various web service standards, such as the Web Service Interoperability (WS-I) guidelines. In some examples, a movement data and/or driving data web service may be implemented in the security and integration layer 160 using the Secure Sockets Layer (SSL) or Transport Layer Security (TLS) protocol to provide secure connections between servers 101 and various clients 141 and 151 (e.g., mobile devices, data analysis servers, etc.). SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in accident prevention, detection and recovery system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a driving or accident database, a vehicle database, insurance customer database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of retrieving driving, vehicle data, and individual data, such as faster response times and less dependence on network conditions when transmitting/receiving accident detection and recovery software applications (or application updates), driving data, vehicle and occupant data, etc.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119 may be used by the various computing devices 101 within an accident prevention, detection and recovery system 100 (e.g., accident prevention software applications, accident detection software applications, customized accident recovery software applications, etc.), including computer executable instructions for receiving and storing driving data from vehicle-based systems, mobile computing devices, and/or vehicle-to-vehicle (V2V) systems, analyzing the driving data to predict potential accidents and determine accidents and accident characteristics, retrieving various vehicle data and individual data relating to the vehicle occupants, determining and providing custom accident recovery services based on the retrieved and analyzed data, and performing other related functions as described herein.

Figure 2:
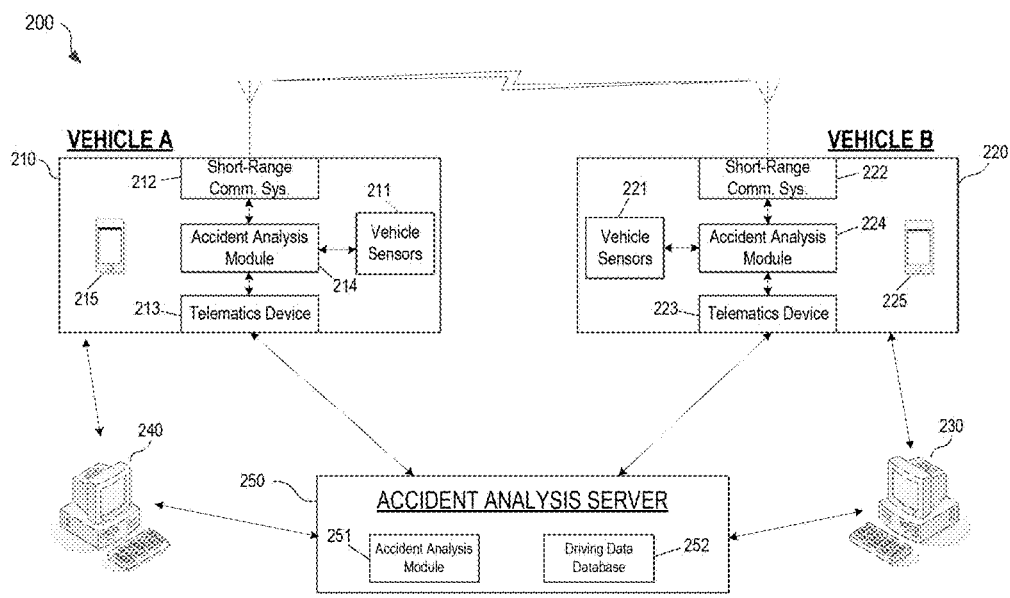
FIG. 2 is a diagram illustrating various components and devices of an accident prevention, detection, and recovery system, according to one or more aspects of the disclosure.

FIG. 2 is a diagram of an illustrative accident prevention, detection and recovery system 200 including first vehicle 210 and second vehicle 220, an accident analysis server 250, and additional related components. Each component shown in FIG. 2 may be implemented in hardware, software, or a combination of the two. Additionally, each component of the accident prevention, detection and recovery system 200 may include a computing device (or system) having some or all of the structural components described above for computing device 101. The illustration of two vehicles is exemplary and any number of vehicles may be incorporated into the accident prevention, detection and recovery system.

Vehicles 210 and 220 in the accident prevention, detection and recovery system 200 may be, for example, automobiles, motorcycles, scooters, buses, recreational vehicles, boats, or other vehicles for which vehicle driving data may be analyzed and for which driver scores may be calculated. The vehicles 210 and 220 each include vehicle operation sensors 211 and 221 capable of detecting and recording various conditions at the vehicle and operational parameters of the vehicle. For example, sensors 211 and 221 may detect and store data corresponding to the vehicle's location (e.g., GPS coordinates), speed and direction, rates of acceleration or braking, and specific instances of sudden acceleration, braking, and swerving. Sensors 211 and 221 also may detect and store data received from the vehicles' 210 and 220 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 211 and 221 may detect and store the external driving conditions, for example, external temperature, rain, snow, light levels, and sun position for driver visibility. For example, external cameras and proximity sensors 211 and 221 may detect other nearby vehicles, traffic levels, road conditions, traffic obstructions, animals, cyclists, pedestrians, and other conditions that may factor into a driving event data analysis. Sensors 211 and 221 also may detect and store data relating to moving violations and the observance of traffic signals and signs by the vehicles 210 and 220. Additional sensors 211 and 221 may detect and store data relating to the maintenance of the vehicles 210 and 220, such as the engine status, oil level, engine coolant temperature, odometer reading, the level of fuel in the fuel tank, engine revolutions per minute (RPMs), and/or tire pressure.

Vehicles sensors 211 and 221 also may include cameras and/or proximity sensors capable of recording additional conditions inside or outside of the vehicles 210 and 220. For example, internal cameras may detect conditions such as the identity of the driver (e.g., using facial recognition software), the number of the occupants, the types of occupants (e.g. adults, children, teenagers, pets, etc.), and the seating/positioning of the occupants in the vehicles. Internal cameras also may detect potential sources of driver distraction within the vehicle, such as pets, phone usage, and unsecured objects in the vehicle. Sensors 211 and 221 also may be configured to collect data identifying a current driver from among a number of different possible drivers, for example, based on driver's seat and mirror positioning, driving times and routes, radio usage, etc. Sensors 211 and 221 also may be configured to collect data relating to a driver's movements or the condition of a driver. For example, vehicles 210 and 220 may include sensors that monitor a driver's movements, such as the driver's eye position and/or head position, etc. Additional sensors 211 and 221 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer.

Certain vehicle sensors 211 and 221 also may collect information regarding the driver's route choice, whether the driver follows a given route, and to classify the type of trip (e.g. commute, errand, new route, etc.). In certain embodiments, sensors and/or cameras 211 and 221 may determine when and how often the vehicles 210 and 220 stay in a single lane or stray into other lanes. A Global Positioning System (GPS), locational sensors positioned inside the vehicles 210 and 220, and/or locational sensors or devices external to the vehicles 210 and 220 may be used determine the route, lane position, and other vehicle position/location data.

The data collected by vehicle sensors 211 and 221 may be stored and/or analyzed within the respective vehicles 210 and 220, and/or may be transmitted to one or more external devices. For example, as shown in FIG. 2, sensor data may be transmitted via short-range communication systems 212 and 222 to other nearby vehicles. Additionally, the sensor data may be transmitted via telematics devices 213 and 223 to one or more remote computing devices, such as accident analysis server 250, and/or to mobile devices 215 and 225 of drivers and passengers within the vehicles 210 and 220. The sensor data may be transmitted from mobile devices 215 and 225 of drivers and passengers within the vehicles 210 and 220 to one or more remote computing devices, such as accident analysis server 250.

Short-range communication systems 212 and 222 are vehicle-based data transmission systems configured to transmit vehicle operational data to other nearby vehicles, and to receive vehicle operational data from other nearby vehicles. In some examples, communication systems 212 and 222 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems 212 and 222 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication systems 212 and 222 may be sent via DSRC, Bluetooth, satellite, GSM infrared, IEEE 802.11, WiMAX, RFID, and/or any suitable wireless communication media, standards, and protocols. In certain systems, short-range communication systems 212 and 222 may include specialized hardware installed in vehicles 210 and 220 (e.g., transceivers, antennas, etc.), while in other examples the communication systems 212 and 222 may be implemented using existing vehicle hardware components (e.g., radio and satellite equipment, navigation computers) or may be implemented by software running on the mobile devices 215 and 225 of drivers and passengers within the vehicles 210 and 220.

The range of V2V communications between vehicle communication systems 212 and 222 may depend on the wireless communication standards and protocols used, the transmission/reception hardware (e.g., transceivers, power sources, antennas), and other factors. Short-range V2V communications may range from just a few feet to many miles, and different types of driving behaviors may be determined depending on the range of the V2V communications. For example, V2V communications ranging only a few feet may be sufficient for a driving analysis computing device 101 in one vehicle to determine that another vehicle is tailgating or cut-off the vehicle, whereas longer communications may allow the device 101 to determine additional types of driving behaviors (e.g., yielding, defensive avoidance, proper response to a safety hazard, etc.).

V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 210 or 220? to any other vehicle, or other infrastructure device capable of receiving the communication, within the range of the vehicle's transmission capabilities. For example, a vehicle 210 or 220? may periodically broadcast (e.g., every 0.1 second, every 0.5 seconds, every second, every 5 seconds, etc.) certain vehicle operation data via its short-range communication system 212, regardless of whether or not any other vehicles or reception devices are in range. In other examples, a vehicle communication system 212 may first detect nearby vehicles and receiving devices, and may initialize communication with each by performing a handshaking transaction before beginning to transmit its vehicle operation data to the other vehicles and/or devices.

The types of vehicle operational data, or vehicle driving data, transmitted by vehicles 210 and 220 may depend on the protocols and standards used for the V2V communication, the range of communications, and other factors. In certain examples, vehicles 210 and 220 may periodically broadcast corresponding sets of similar vehicle driving data, such as the location (which may include an absolute location in GPS coordinates or other coordinate systems, a relative location with respect to another vehicle or a fixed point, and/or altitude data for vehicles 210 and 220), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 210 or 220 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's 210 or 220 internal systems that the vehicle is skidding, that an impact has occurred, or that the vehicle's airbags have been deployed, also may be transmitted in V2V communications. In various other examples, any data collected by any vehicle sensors 211 and 221 potentially may be transmitted via V2V communication to other nearby vehicles or infrastructure devices receiving V2V communications from communication systems 212 and 222. Further, additional vehicle driving data not from the vehicle's sensors (e.g., vehicle make/model/year information, driver insurance information, driving route information, vehicle maintenance information, driver scores, etc.) may be collected from other data sources, such as a driver's or passenger's mobile device 215 or 225, accident analysis server 250, and/or another external computer system 230 or 240, and transmitted using V2V communications to nearby vehicles and other receiving devices using communication systems 212 and 222.

As shown in FIG. 2, the data collected by vehicle sensors 211 and 221 also may be transmitted to an accident analysis server 250, and one or more additional external servers and devices via telematics devices 213 and 223. Telematics devices 213 and 223 may be computing devices containing many or all of the hardware/software components as the computing device 101 depicted in FIG. 1. As discussed above, the telematics devices 213 and 223 may receive vehicle operation data and driving data from vehicle sensors 211 and 221, and may transmit the data to one or more external computer systems (e.g., accident analysis server 250 of an insurance company, financial institution, or other entity) over a wireless transmission network. Telematics devices 213 and 223 also may be configured to detect or determine additional types of data relating to real-time driving and the condition of the vehicles 210 and 220. In certain embodiments, the telematics devices 213 and 223 may contain or may be integral with one or more of the vehicle sensors 211 and 221. The telematics devices 213 and 223 also may store the type of their respective vehicles 210 and 220, for example, the make, model, trim (or sub-model), year, and/or engine specifications, as well as other information such as vehicle owner or driver information, insurance information, and financing information for the vehicles 210 and 220.

In the example shown in FIG. 2, telematics devices 213 and 223 may receive vehicle driving data from vehicle sensors 211 and 221, and may transmit the data to an accident analysis server 250. However, in other examples, one or more of the vehicle sensors 211 and 221 may be configured to transmit data directly to an accident analysis server 250 without using a telematics device. In other example, telematics devices 213 and 223 may be configured to transmit vehicle driving data to mobile devices 215 and 225. For instance, telematics devices 213 and 223 may be configured to receive and transmit data from certain vehicle sensors 211 and 221, while other sensors may be configured to directly transmit data to an accident analysis server 250 without using the telematics device 213 or 223. In other examples, one or more of the vehicle sensors 211 and 221 may be configured to transmit data to mobile devices 215 and 225 of drivers and passengers within the vehicles 210 and 220 without using a telematics data. For instance, telematics devices 213 and 223 may be configured to receive and transmit data from certain vehicle sensors 211 and 221, while other sensors may be configured to directly transmit data to mobile devices 215 and 225 of drivers and passengers within the vehicles 210 and 220 without using the telematics device 213 or 223. Mobile devices 215 and 225 may be configured to transmit the received sensor data to accident analysis server 250. Thus, telematics devices 213 and 223 may be optional in certain embodiments.

In certain embodiments, mobile computing devices 215 and 225 within the vehicles 210 and 220 may be used to collect vehicle driving data and/or to receive vehicle driving data from sensors 211 and 221, and then to transmit the vehicle driving data to the accident analysis server 250 and other external computing devices directly or via telematics devices 213 and 223. As used herein, mobile computing devices 215 and 225 "within" the vehicles 210 and 220 refer to a mobile device 215 or 225 that is inside of or otherwise secured to a moving vehicle, for instance, mobile devices 215 or 225 in the cabins of automobiles, buses, recreational vehicles, mobile devices 215 or 225 traveling in open-air vehicles such as motorcycles, scooters, or boats, and mobile devices 215 or 225 in the possession of drivers or passengers of vehicles 210 and 220. Mobile computing devices 215 and 225 may be, for example, mobile phones, personal digital assistants (PDAs), or tablet computers of the drivers or passengers of vehicles 210 and 220. Software applications executing on mobile devices 215 and 225 may be configured to detect certain driving data independently and/or may communicate with vehicle sensors 211 and 221 to receive additional driving data. For example, mobile devices 215 and 225 may be equipped with movement sensors, such as an accelerometer, gyroscope, speedometer, and/or GPS receivers, and may determine vehicle location, speed, acceleration, direction and other basic driving data without needing to communicate with the vehicle sensors 211 or 221, or any vehicle system. In other examples, software on the mobile devices 215 and 225 may be configured to receive some or all of the driving data collected by vehicle sensors 211 and 221. Software applications executing on mobile devices 215 and 225 may be configured to detect data from wearable devices. For example, a driver and/or passenger in vehicles 210 and 220 may wear a smart watch or fitness tracker that can track various health-related parameters of the wearer, such as heart rate, blood-glucose level, and/or body temperature. Software applications executing on mobile devices 215 and 225 may be configured to receive the health-related parameters from the wearable devices. The received data may then be used in conjunction with the sensor data detected by mobile devices 215 and 225.

When mobile computing devices 215 and 225 within the vehicles 210 and 220 are used to detect vehicle driving data and/or to receive vehicle driving data from vehicles 211 and 221, the mobile computing devices 215 and 225 may store, analyze, and/or transmit the vehicle driving data to one or more other devices. For example, mobile computing devices 215 and 225 may transmit vehicle driving data directly to one or more driving analysis servers 250, and thus may be used in conjunction with or instead of telematics devices 213 and 223. Additionally, mobile computing devices 215 and 225 may be configured to perform the V2V communications described above, by establishing connections and transmitting/receiving vehicle driving data to and from other nearby vehicles. Thus, mobile computing devices 215 and 225 may be used in conjunction with or instead of short-range communication systems 212 and 222 in some examples. Moreover, the processing components of the mobile computing devices 215 and 225 may be used to analyze vehicle driving data, determine driving behaviors, calculate driver scores, and perform other related functions. Therefore, in certain embodiments, mobile computing devices 215 and 225 may be used in conjunction with, or in place of, the accident analysis modules 214 and 224.

Vehicles 210 and 220 may include accident analysis modules 214 and 224, which may be separate computing devices or may be integrated into one or more other components within the vehicles 210 and 220, such as the short-range communication systems 212 and 222, telematics devices 213 and 223, or the internal computing systems of vehicles 210 and 220. As discussed above, accident analysis modules 214 and 224 also may be implemented by computing devices independent from the vehicles 210 and 220, such as mobile computing devices 215 and 225 of the drivers or passengers, or one or more separate computer systems 230 or 240 (e.g., a user's home or office computer). In any of these examples, the accident analysis modules 214 and 224 may contain some or all of the hardware/software components as the computing device 101 depicted in FIG. 1. Further, in certain implementations, the functionality of the accident analysis modules, such as storing and analyzing vehicle driving data, determining driving behaviors, predicting potential accidents, and detecting an accident, may be performed in a central accident analysis server 250 rather than by individual vehicles 210 and 220. In such implementations, the vehicles 210 and 220 might only collect and transmit vehicle driving data to an accident analysis server 250, and thus the vehicle-based accident analysis modules 214 and 224 may be optional.

Accident analysis modules 214 and 224 may be implemented in hardware and/or software configured to receive vehicle driving data from vehicle sensors 211 and 221, short-range communication systems 212 and 222, telematics devices 213 and 223, mobile computing devices 215 and 225, and/or other driving data sources. After receiving the vehicle driving data, accident analysis modules 214 and 224 may perform a set of functions to analyze the driving data, determine driving behaviors, predict a potential accident, and detect an accident. For example, the accident analysis modules 214 and 224 may include one or more driving behavior analysis algorithms, accident prediction algorithms, and accident detection algorithms, which may be executed by software running on generic or specialized hardware within the accident analysis modules. The accident analysis module 214 in a first vehicle 210 may use the vehicle driving data received from that vehicle's sensors 211, along with vehicle driving data for other nearby vehicles received via the short-range communication system 212, to determine driving behaviors and predict a potential accident and/or detect an accident involving first vehicle 210 or nearby vehicles. Further descriptions and examples of the algorithms, functions, and analyses that may be executed by the accident analysis modules 214 and 224 are described below in reference to FIGS. 3-8.

The system 200 also may include an accident analysis server 250, containing some or all of the hardware/software components as the computing device 101 depicted in FIG. 1. The accident analysis server 250 may include hardware, software, and network components to receive vehicle driving data from one or more vehicles 210 and 220, mobile devices 215 and 225, and other data sources. The accident analysis server 250 may include a driving data database 252 and accident analysis module 251 to respectively store and analyze driving data received from vehicles and other data sources. The accident analysis server 250 may initiate communication with and/or retrieve driving data from vehicles 210 and 220 wirelessly via telematics devices 213 and 223, mobile devices 215 and 225, or by way of separate computing systems (e.g., computer 230 or 240) over one or more computer networks (e.g., the Internet). Additionally, the accident analysis server 250 may receive additional data relevant to driving behavior determinations from other non-vehicle data sources, such as external traffic databases containing traffic data (e.g., amounts of traffic, average driving speed, traffic speed distribution, and numbers and types of accidents, etc.) at various times and locations, external infrastructure elements (e.g. photos and videos of the surrounding area, sent to the accident analysis server 250 in real-time or at periodic time intervals), external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.)

Data stored in the driving data database 252 may be organized in any of several different manners. For example, a table in database 252 may contain all of the vehicle operation data for a specific vehicle 210, similar to a vehicle event log. Other tables in the database 252 may store certain types of data for multiple vehicles. For instance, tables may store specific driving behaviors and interactions (e.g., accidents, tailgating, cutting-off, yielding, racing, defensive avoidances, etc.) for multiples vehicles and/or multiple drivers. Vehicle driving data may also be organized by time and/or place, so that the driving behaviors or interactions between multiples vehicles 210 and 220 may be stored or grouped by time and location.

The accident analysis module 251 within the accident analysis server 250 may be configured to retrieve data from the driving data database 252, or may receive driving data directly from vehicles 210 and 220, computing devices 215 and 225, or other data sources, and may perform functions such as detecting and recording dangerous driving behavior, detecting an imminent collision, transmitting warnings to vehicles based on dangerous driving behaviors and/or imminent collisions, detecting collisions, collecting data related to dangerous driving behaviors and/or collisions, performing post-collision processing, and other related functions. The functions performed by the accident analysis module 251 may be similar to those of accident analysis modules 214 and 224, and further descriptions and examples of the algorithms, functions, and analyses that may be executed by the accident analysis module 251 are described below in reference to FIGS. 3-8.

In various examples, the driving data analyses, accident prediction, and accident detection may be performed entirely in the accident analysis module 251 of the accident analysis server 250 (in which case accident analysis modules 214 and 224 need not be implemented in vehicles 210 and 220), may be performed entirely in the vehicle-based accident analysis modules 214 and 224 (in which case the accident analysis module 251 and/or the accident analysis server 250 need not be implemented), or may be performed entirely on mobile devices 215 and 225 (in which case accident analysis modules 214 and 224 need not be implemented in vehicles 210 and 220 and the accident analysis module 251 and/or the accident analysis server 250 need not be implemented). In other examples, certain driving data analyses may be performed by vehicle-based accident analysis modules 214 and 224, while other driving data analyses are performed by mobile devices 215 and/or 225, while other driving data analyses are performed by the accident analysis module 251 at the accident analysis server 250. For example, a vehicle-based accident analysis module 214 may continuously receive and analyze driving data from nearby vehicles to determine certain driving behaviors (e.g., tailgating, cutting-off, yielding, etc.) so that large amounts of driving data need not be transmitted to the accident analysis server 250. However, after certain driving behavior is determined by the vehicle-based accident analysis module 214 (e.g. excessive speeding, excessive tailgating, etc.), the behavior may be transmitted to the server 250, and the accident analysis module 251 may determine if a collision is likely to occur or if a collision has been detected.

Figure 3:
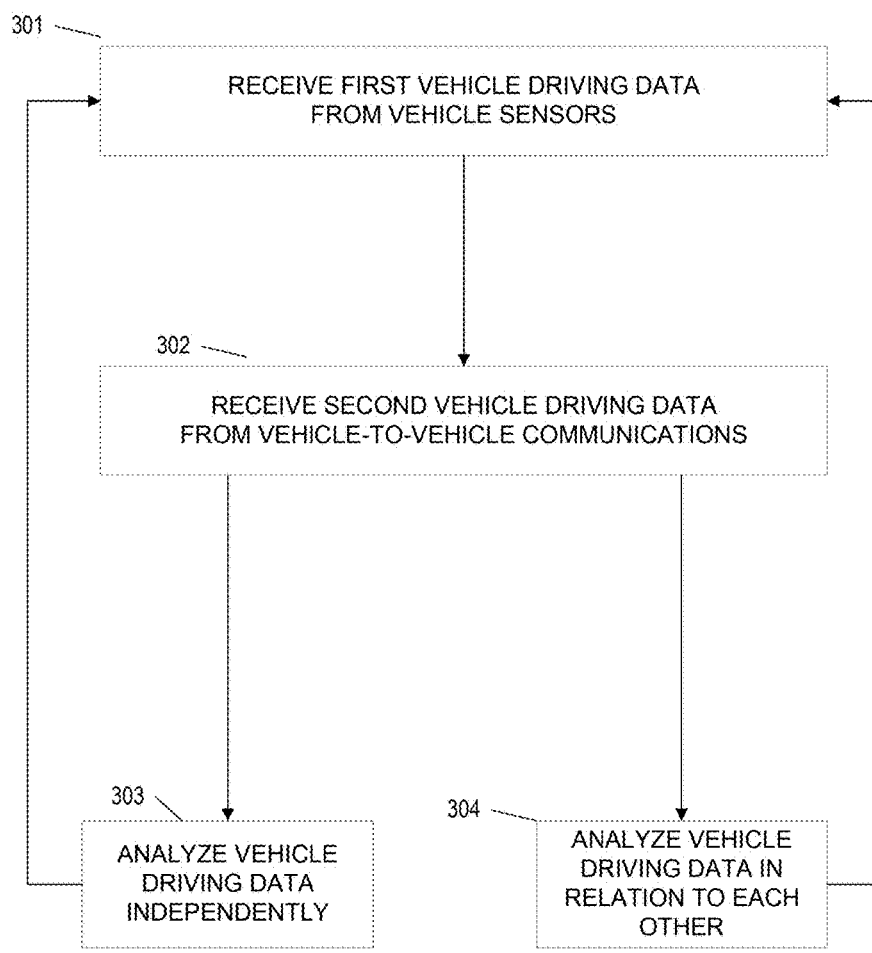
FIG. 3 is a flow diagram illustrating an example method of an execution of an accident module according to one or more aspects described herein.

FIG. 3 is a flow diagram illustrating an example method of predicting or detecting a collision based on analyses of vehicle driving data via an accident analysis module. This example method may be performed by an accident analysis module executing on one or more computing devices within accident prevention, detection, and recovery system 200, such as analysis modules 214 and 224, accident analysis module 251 executing on an accident analysis server 250, or an accident analysis module executing on mobile devices 215 and 225, and/or other computer systems. The example method may be performed for two more vehicles, such as first vehicle 210 and second vehicle 220.

In step 301, vehicle driving data may be received for a first vehicle 210. The vehicle driving data received for first vehicle 210 may be compiled by sensors 211 of first vehicle 210 and/or sensors embedded in mobile device 215. The vehicle driving data received for first vehicle 210 may be stored on the same computing platform as the computing platform on which the accident analysis module is executing. The accident analysis module may further forward the vehicle driving data received for first vehicle 210 to a different computing platform, including any of the computing platforms on which sub-modules of the accident analysis module are executing (discussed in more detail below in reference to FIGS. 4-8).

If the example method is being performed by accident analysis module 214, the vehicle driving data for first vehicle 210 may be received from the sensors 211, telematics device 213, or mobile device 215, and may be stored within accident analysis module 214 or telematics device 213 for subsequent analysis. If the example method is being performed by mobile device 215 (that is, the accident analysis module is executing on mobile device 215), the vehicle driving data for first vehicle 210 may be received directly by mobile device 215 from the sensors 211. Alternatively, mobile device 215 can receive the vehicle driving data from the sensors 211 via telematics device 213. Additionally, or alternatively, the accident analysis module may receive vehicle driving data for first vehicle 210 from the sensors embedded within the mobile device 215. If the example method is being performed by accident analysis module 251, the vehicle driving data for first vehicle 210 may be received at accidental analysis server 250 via telematics device 213 or mobile device 215.

If the example method is being performed by accident analysis module 224, the vehicle driving data for first vehicle 210 may be received via one or more V2V transmittals between short-range communications system 212 and short-range communications system 222. Alternatively, or additionally, the vehicle driving data for the first vehicle 210 may be transmitted from mobile device 215 to mobile device 225, which may then transmit the received vehicle driving data for first vehicle 210 to accident analysis module 224. Alternatively, or additionally, the vehicle driving data for first vehicle 210 may be transmitted from mobile device 215 and/or telematics unit 213 to accident analysis server 250. Accident analysis server 250 may then transmit the vehicle driving data for first vehicle 210 to driving analysis module 224 from via one or more of telematics device 223, mobile device 225, and another computing device 230.

If the example method is being performed by mobile device 225 (that is, the accident analysis module is executing on mobile device 225), the vehicle driving data for first vehicle 210 may be received via one or more V2V transmittals between short-range communications system 212 and short-range communications system 222. For example, one or more of the telematics unit 213 and the mobile device 215 can transmit the vehicle driving data for first vehicle 210 to short-range communications system 212, which may then transmit the vehicle driving data to short-range communications system 222 via one or more V2V transmittals. The vehicle driving data received at short-range communications system 222 may be transmitted to mobile device 225 directly or via telematics device 223. Alternatively, or additionally, the vehicle driving data for the first vehicle 210 may be transmitted from mobile device 215 to mobile device 225. Alternatively, or additionally, the vehicle driving data for first vehicle 210 may be transmitted from mobile device 215 and/or telematics unit 213 to accident analysis server 250. Accident analysis server 250 may then transmit the vehicle driving data for first vehicle 210 to mobile device 225 directly, or via one or more of telematics device 223, and another computing device 230.

In step 302, vehicle driving data may be received for a second vehicle 220. The vehicle driving data received for second vehicle 220 may be compiled by one or more of sensors 221 of second vehicle 220 or sensors embedded within mobile device 225. The vehicle driving data received for second vehicle 220 may be stored on the same computing platform as the computing platform on which the accident analysis module is executing. Accident analysis module may further forward the vehicle driving data received for second vehicle 220 to a different computing platform, including any of the computing platforms on which sub-modules of the accident analysis module are executing (discussed in more detail below in reference to FIGS. 4-8).

If the example method is being performed by accident analysis module 224, the vehicle driving data for second vehicle 220 may be received from one or more of the sensors 221, telematics device 223, and mobile device 225, and may be stored within driving analysis module 224 or telematics device 223 for subsequent analysis. If the example method is being performed by mobile device 225 (that is, the accident analysis module is executing on mobile device 225), the vehicle driving data for second vehicle 220 may be received directly by mobile device 225 from the sensors 221. Alternatively, mobile device 225 can receive the vehicle driving data from the sensors 221 via telematics device 223. Additionally, or alternatively, the accident analysis module may receive vehicle driving data for second vehicle 220 from the sensors embedded within the mobile device 225. If the example method is being performed by accident analysis module 251, the vehicle driving data for second vehicle 220 may be received at accident analysis server 250 via one or more of telematics device 223, mobile device 225, and other computing device 230.

If the example method is being performed by accident analysis module 214, the vehicle driving data for second vehicle 220 may be received via one or more V2V transmittals between short-range communications system 222 and short-range communications system 212. For example, one or more of the telematics unit 223 and the mobile device 225 can transmit the vehicle driving data for second vehicle 220 to short-range communications system 222, which may then transmit the vehicle driving data to short-range communications system 212 via one or more V2V transmittals. The vehicle driving data received at short-range communications system 212 may be transmitted to accident analysis module 214. Alternatively, or additionally, the vehicle driving data for the second vehicle 220 may be transmitted from mobile device 225 to mobile device 215, and then transmitted from mobile device 215 to accident analysis module 214. Alternatively, or additionally, the vehicle driving data for second vehicle 220 may be transmitted from mobile device 225 and/or telematics unit 223 to accident analysis server 250. Accident analysis server 250 may then transmit the received vehicle driving data for second vehicle 220 to accident analysis module 214 via one or more of telematics device 213, mobile device 215, and another computing device 240.

If the example method is being performed by mobile device 215 (that is, the accident analysis module is executing on mobile device 215), the vehicle driving data for second vehicle 220 may be received via one or more V2V transmittals between short-range communications system 222 and short-range communications system 212. For example, one or more of the telematics unit 223 and the mobile device 225 can transmit the vehicle driving data for second vehicle 220 to short-range communications system 222, which may then transmit the vehicle driving data to short-range communications system 212 via one or more V2V transmittals. The vehicle driving data received at short-range communications system 212 may be transmitted to mobile device 215 directly or via telematics device 213. Alternatively, or additionally, the vehicle driving data for the second vehicle 220 may be transmitted from mobile device 225 to mobile device 215. Alternatively, or additionally, the vehicle driving data for second vehicle 220 may be transmitted from mobile device 225 and/or telematics unit 223 to accident analysis server 250. The vehicle driving data for second vehicle 220 may then be transmitted to mobile device 215 directly, or via one or more of telematics device 213, and another computing device 240.

The received vehicle driving data for first vehicle 210 and second vehicle 220 may be stored in telematics devices 213 and 223, mobile devices 215 and 225, accident analysis modules 214 and 224, and/or driving data database 252. The data received in steps 301 and 302 may include, for example, the vehicle's location (e.g., GPS coordinates), speed and direction, rates of acceleration or braking, specific instances of sudden acceleration, braking, and swerving, nearby vehicles, the driver's eye position and/or head position, the physical or mental state of the driver, such as fatigue or intoxication, when and how often first vehicle 210 and/or second vehicle 220 stays in a single lane or strays into other lanes, and any other data collected by vehicle sensors 211 and 221 and/or mobile devices 215 and 225 as described above in reference to FIG. 2.

Vehicle driving data for first vehicle 210 and second vehicle 220 may be received in real-time or substantially in real-time. For example, mobile devices 215 and 225 may be configured to transmit vehicle driving data for first vehicle 210 and vehicle driving data for second vehicle 220, respectively, in real-time to accident analysis server 250. Alternatively, vehicle driving data for first vehicle 210 and second vehicle 220 may be received at predetermined intervals. Alternatively, or additionally, vehicle driving data for first vehicle 210 and second vehicle 220 may be received upon a request for the data by one or more computing devices or modules in the accident prevention, detection, and recovery system 200, such as accident analysis modules 214 and 215, mobile devices 215 and 225, and accident analysis module 251. For example, telematics device 213 may be configured to transmit vehicle data for first vehicle 210 to driving data database 252 at a first predetermined interval. If analysis by the accident analysis module indicates that a collision is imminent or has occurred (discussed in reference to step 304 below), or that the driving behavior of first vehicle 210 indicates reckless or dangerous driving (discussed in reference to step 303 below), the accident analysis module may adjust the frequency of the first predetermined time interval (i.e. increase the frequency) or may dynamically configure telematics device 213 to transmit vehicle data for first vehicle 210 to driving data database 252 in real-time.

In another example, one or more of the vehicle sensors 211 and 221 may be configured to transmit vehicle driving data to mobile devices 215 and 225 on a periodic basis. In turn, mobile devices 215 may be configured to transmit the vehicle driving data for first vehicle 210 to accident analysis module 251 at a first predetermined interval, and mobile device 225 may be configured to transmit vehicle data for second vehicle 220 to accident analysis module 251 at a second predetermined interval. The first and second predetermined interval may be the same or may be different. The first predetermined interval may be set by the driver of first vehicle 210, or may be set by an interested third party (such as an insurance company) to a default value or to a value customized for a driver of the first vehicle 210. The second predetermined interval may be set by the driver of second vehicle 220, or may be set by an interested third party (such as an insurance company) to a default value or to a value customized for a driver of the second vehicle 220. If analysis by the accident analysis module 251 indicates that a collision involving first vehicle 210 or second vehicle 220 is imminent or has occurred (discussed in reference to step 304 below), or that the driving behavior of first vehicle 210 or second vehicle 220 indicates reckless or dangerous driving (discussed in reference to step 303 below), accident analysis module 251 may adjust the frequency of the first and/or second predetermined time interval (i.e. increase the frequency), dynamically configure mobile devices 215 and/or 225 to transmit vehicle data for first vehicle 210 and/or second vehicle 220 to accident analysis module 251 in real-time, and/or make one or more standalone requests for driving data from one or more of mobile devices 215 and 225.

In step 303, the vehicle driving data received from first vehicle 210 and the vehicle driving data received from second vehicle 220 may be analyzed independently. The independent analysis may be done in real-time or near real-time. For example, the vehicle driving data received from first vehicle 210 may be analyzed to determine if the driving data indicates reckless or dangerous driving. This may be performed by extracting one or more parameters from the vehicle driving data received from first vehicle 210 and comparing each of the parameters to predetermined thresholds set for each of the parameters. The predetermined thresholds may have been previously set by the driver of first vehicle 210, may have been previously set by an interested party (such as an insurance provider) to a default value or to a value customized for a driver of the first vehicle 210, or may be dynamically based on the speed limit or riskiness of the road on which first vehicle 210 is travelling. For example, a speed $S_0$ of first vehicle 210 at time $T_0$ may be extracted from the vehicle driving data received from first vehicle 210 and compared to a predetermined speed threshold. The vehicle driving data received from second vehicle 220 may be similarly analyzed.

In another example, the extracted parameters may be analyzed over a predetermined time interval. For example, the average speed $S_{0 \ldots n}$ for first vehicle 210 over time interval $T_{0 \ldots n}$ may be extracted and compared to a first predetermined threshold. Data representing how much first vehicle 210 is straying $A_{0 \ldots n}$ over time interval $T_{0 \ldots n}$ may be additionally or alternatively extracted and compared to a second predetermined threshold. Each of the extracted sets may be weighted (for example, weight $W_1$ may be assigned to $S_{0 \ldots n}$ and weight $W_2$ may be assigned to $A_{0 \ldots n}$). Time interval $T_{0 \ldots n}$ may be set by a driver or owner of first vehicle 210, or by an interested third party (such as an insurance provider). Alternatively, time interval $T_{0 \ldots n}$ may be a streaming window. The weighted factors may be summed and compared to a third predetermined threshold. The vehicle driving data received from second vehicle 220 may be similarly analyzed.

Figure 5:
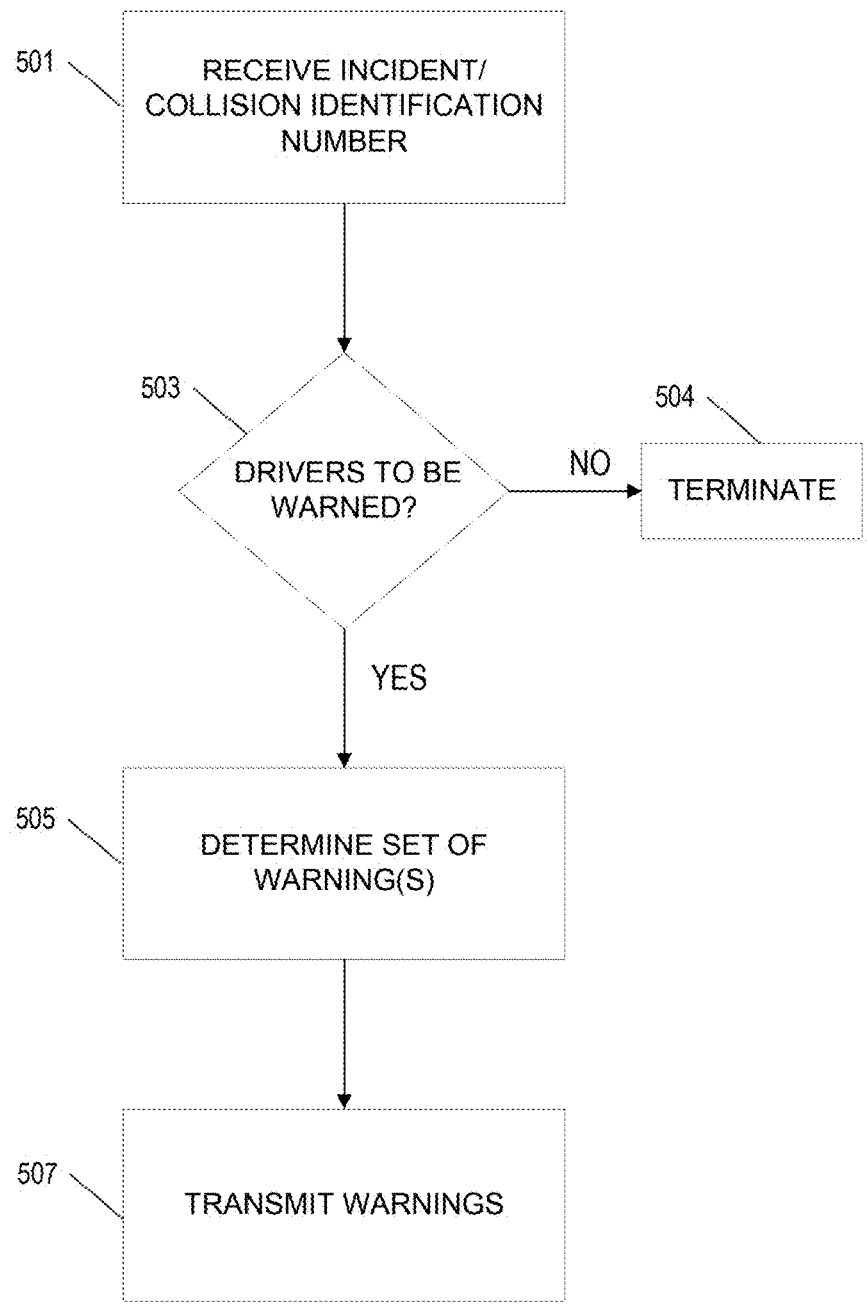
FIG. 5 is a flow diagram illustrating an example method of an execution of a warnings module according to one or more aspects described herein.
Figure 6:
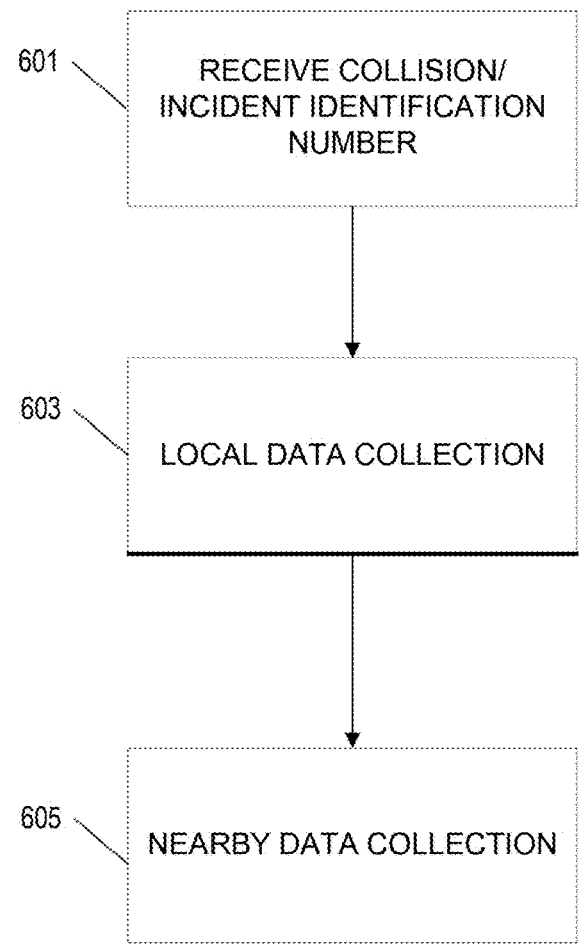
FIG. 6 is a flow diagram illustrating an example method of an execution of a collections module according to one or more aspects described herein.
Figure 7A:
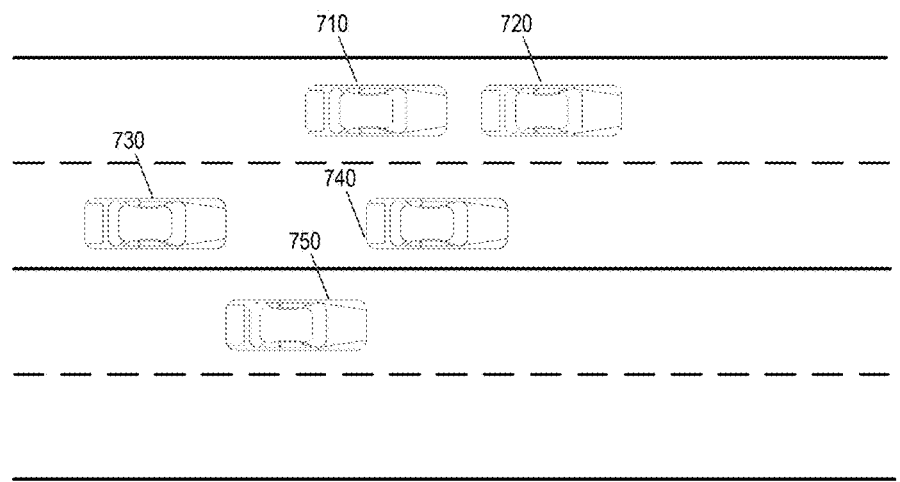
FIGS. 7A-7B are diagrams illustrating example locations and configurations of various vehicles that are to be used by a collections module according to one or more aspects described herein.
Figure 7B:
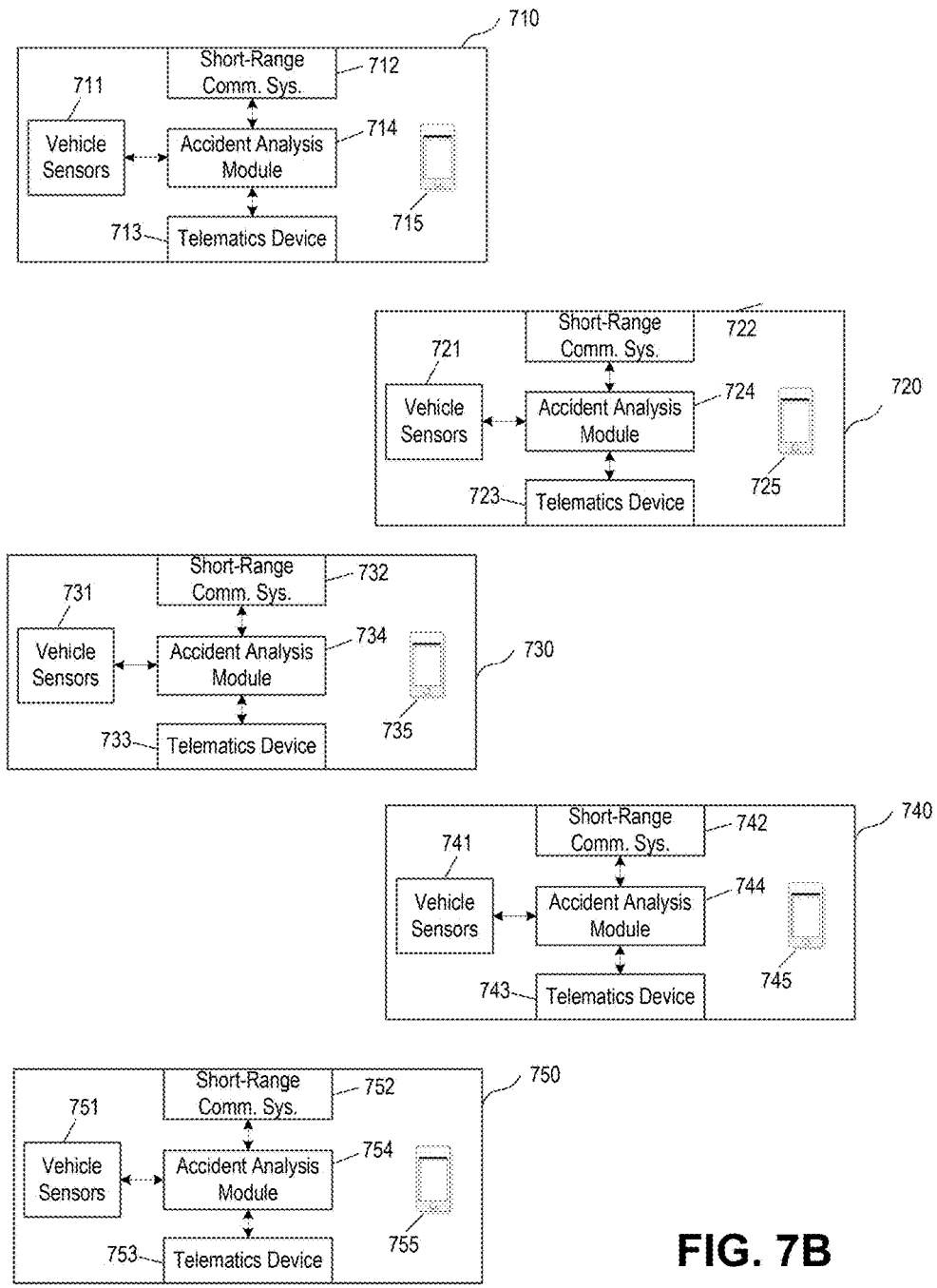

If the analysis indicates that the driving data indicates reckless or dangerous driving, the accident analysis module may trigger the warnings module and the collections module (described in detail in FIGS. 5 and 6, respectively). When triggering the warnings module and the collections module, the accident analysis module may include an incident identification number identifying the particular driving behavior that is deemed to be reckless and dangerous and a time frame at which the particular driving behavior was detected.

As discussed above, the predetermined thresholds and time intervals may be determined by a driver or owner of first vehicle 210 and second vehicle 220, or may be set by an interested third-party. In the case of the former, the selection may be done via a web interface for a software application. For example, the driver or owner of first vehicle 210 may install the software application on mobile device 215. The selections made by the driver or owner of first vehicle 210 via the software application on mobile device 215 may be transmitted for storage in driving data database 252 and/or the accident analysis module 214. The selections may be accessible by the accident analysis module. In the case of the latter, the selection may be stored in any of the computing devices shown in FIGS. 1 and 2, such as accident analysis server 250, and may also be accessible by the accident analysis module.

The software application installed on mobile device 215 may present a graphical user interface to the user. The graphical user interface may include a list of driving data parameters. For one or more of the listed driving data parameters, the graphical user interface may further display a recommended value or range of values. The recommended values or range of values may be based on historical driving data for the user. The historical driving data for the user may be retrieved from any of the computing devices shown in FIGS. 1 and 2, such as accident analysis server 250. Alternatively, the historical driving data for the user may be retrieved from mobile device 215. The recommended value or range of values may additionally or alternatively be based on historical driving behavior for other drivers. The historical driving behaviors for other drivers may be retrieved from a database maintained by interested third parties, such as a server maintained by an insurance provider. The historical driving behavior of the user and/or the other drivers may include speed, rates of acceleration or braking, specific instances of sudden acceleration, braking, and swerving, horn usage, turn signal usage, seat belt usage, phone and radio usage within the vehicle, accident data, reaction time, and the like. For example, the recommended speed value of the user may be based on the average speed of the other drivers.

In one instance, the recommended value or range of values may be based on a comparison of the historical driving behavior of the user and the historical driving behavior of the other drivers. For example, an average reaction time of the driver of first vehicle 210, the driver of second vehicle 220, and the other drivers may be computed. The average reaction time of the driver of first vehicle 210 may be greater than the average reaction time of the other drivers, while the average reaction time of the driver of second vehicle 220 may be less than the average reaction time of the other drivers. Accordingly, the recommended predetermined threshold value or range of values for a sudden acceleration for the driver of first vehicle 210 may be greater than the recommended predetermined threshold value or range of values for a sudden acceleration for the driver of second vehicle 220. In another example, the accident rate of the driver of first vehicle 210 may be greater than the average accident rate of the other drivers, while the average accident rate of the driver of second vehicle 220 may be less than the average accident rate of the other drivers. Accordingly, the recommended predetermined threshold value or range of values corresponding to speed for the driver of first vehicle 210 may be less than the recommended predetermined threshold value or range of values corresponding to speed for the driver of second vehicle 220.

The user may select, for one or more of the listed driving parameters, the recommended value or a value within the recommended range. If the value selected by the user is outside a preset limit, an error message may be presented to the user, and the user may be prompted to select a different value. Alternatively, if the value selected by the user is outside a preset limit, the user-selected value may be automatically changed to a predetermined default value. If the user does not select a value for one or more of the listed driving parameters, a default value may be selected. The default value may be determined based on the historical driving behavior of the user, the historical driving behavior of other drivers, or a comparison of the historical driving behavior of the user and the historical driving behavior of other drivers.

At step 304, the vehicle driving data received from first vehicle 210 and the vehicle driving data received from second vehicle 220 may be analyzed in relation with one another in real-time or substantially in real-time. That is, the vehicle driving data from first vehicle 210 may be compared to vehicle driving data from second vehicle 220 in real-time to determine if first vehicle 210 and second vehicle 220 are likely to collide or have collided. The analysis may be performed in real-time by a relational detection collision module. Steps 303 and 304 may be performed sequentially or in parallel. Step 304 may be performed by one or more of accident analysis module 214, mobile device 215, driving analysis module 225, mobile device 225, and accident analysis module 251. The details of analyzing the vehicle driving data of first vehicle 210 in relation to the vehicle driving data of second vehicle 220 in real-time will be discussed in greater detail in reference to FIG. 4. Processing may return to step 301 after steps 303 and 304 have executed.

Figure 4:
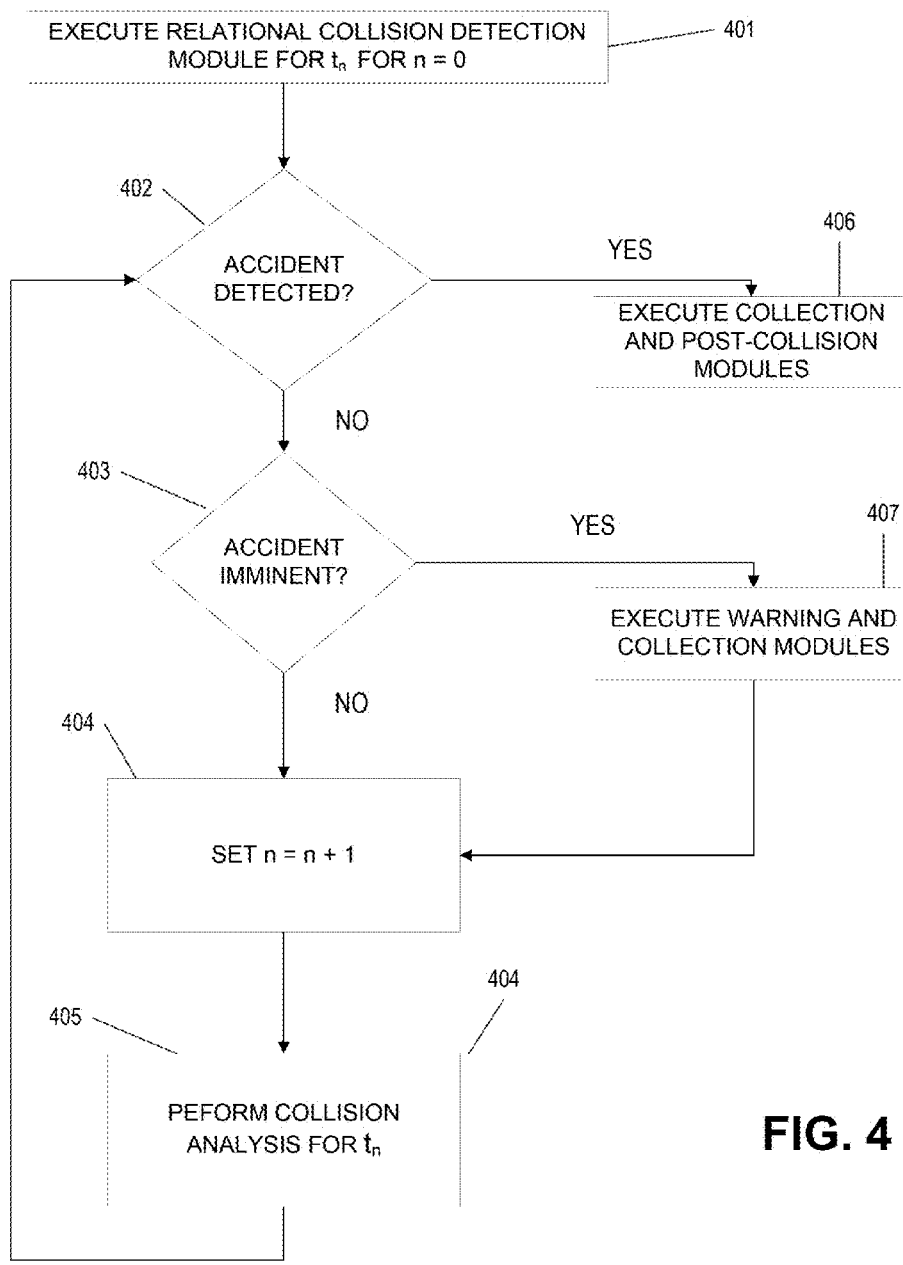
FIG. 4 is a flow diagram illustrating an example method of an execution of a relational collision module according to one or more aspects described herein.

FIG. 4 is a flow diagram illustrating an example method of determining whether a collision is imminent or has occurred based on analyses of vehicle driving data from two or more vehicles in real-time via a relational collision module. The relational detection collision module may be a sub-module of the accident analysis module. The relational collision module may execute on the same computing platform as the accident analysis module, or may execute on a different computing platform than the accident analysis module. The relational collision module may be configured such that the relational collision module may access the vehicle driving data received by the accident analysis module from first vehicle 210 and second vehicle 220 in steps 301 and 302 of FIG. 3.

At step 401, a relational collision module may begin executing at time $t_0$. The relational collision module may execute from time $t_0$ to time $t_n$. Time t may be measured in units of ms, sec, or minutes. Termination of the relational collision module at time $t_n$ may be triggered by the detection of a collision. The relational collision module may include analyzing, in real-time, the driving data (e.g., location, speed, acceleration, direction) received from first vehicle 210 in view of corresponding driving data (e.g., location, speed, acceleration, direction) received from a second vehicle 220. The location data for first vehicle 210 and second vehicle 220 may be extracted from the driving data received from first vehicle 210 and second vehicle 220, respectively, at steps 301 and 302. The speed, acceleration, and direction data may be similarly extracted. The extracted parameters may be used in the first iteration of relational collision detection module and may be stored in a memory unit, such as driving data database 252.

The location data may be GPS data and may indicate three-dimensional positional information (X-axis, Y-axis, and Z-axis) for each vehicle. Analyzing the location data may include comparing the X-axis positional information of first vehicle 210 with the X-axis positional information of second vehicle 220, comparing the Y-axis positional information of first vehicle 210 with the Y-axis positional information of second vehicle 220, and comparing the Z-axis positional information of first vehicle 210 with the Z-axis positional information of second vehicle 220. The relational collision module may determine, at step 402, if a collision between first vehicle 210 and second vehicle 220 has occurred. If the positional information indicates an overlap in one or more of the three dimensions, it may be determined that vehicles 210 and 220 have collided. In one example, a collision may be detected if there is an overlap in two or more of the three dimensions. In another example, a collision may be detected if there is an overlap in each of the three dimensions. An overlap may be established if the difference in the X-axis positional information of first vehicle 210 and the X-axis positional information of second vehicle 220 is within a first predetermined range, if the difference in the Y-axis positional information of first vehicle 210 and the Y-axis positional information of second vehicle 220 is within a second predetermined range, and if the difference in the Z-axis positional information of first vehicle 210 and the Z-axis positional information of second vehicle 220 is within a third predetermined range. The first predetermined range, the second predetermined range, and the third predetermined range may be defined within the relational collision module, and may be different ranges or may be the same ranges. The calculated differences in the X-axis, Y-axis, and Z-axis positional data may be stored for future iterations of the exemplary method, for example, step 405, and for potential warnings and post-collision processing.

Alternatively, analyzing the location data may include comparing the X-axis positional information of first vehicle 210 with the X-axis positional information of second vehicle 220, comparing the Y-axis positional information of first vehicle 210 with the Y-axis positional information of second vehicle 220, and only comparing the Z-axis positional information of first vehicle 210 with the Z-axis positional information of second vehicle 220 if there is an overlap in one or more of the X-axis positional information of the two vehicles and the Y-axis positional information of the two vehicles. That is, if the difference in the X-axis positional information of first vehicle 210 and the X-axis positional information of second vehicle 220 is within a first predetermined range, or if the difference in the Y-axis positional information of first vehicle 210 and the Y-axis positional information of second vehicle 220 is within a second predetermined range, the Z-axis positional information of first vehicle 210 may be compared to the Z-axis positional information of second vehicle 220 to determine if the difference between the two is within a third predetermined range. Alternatively, if the difference in the X-axis positional information of first vehicle 210 and the X-axis positional information of second vehicle 220 is within a first predetermined range, and if the difference in the Y-axis positional information of first vehicle 210 and the Y-axis positional information of second vehicle 220 is within a second predetermined range, the Z-axis positional information of first vehicle 210 may be compared to the Z-axis positional information of second vehicle 220 to determine if the difference between the two is within a third predetermined range. If the difference in the Z-axis positional information of first vehicle 210 and second vehicle 220 is within a third predetermined range, the collision detection module may determine that a collision has occurred. The calculated differences in the X-axis, Y-axis, and Z-axis positional data may be stored for future iterations of the example method, for example, step 405, and for potential warnings and post-collision processing.

Analysis of the velocity data for first vehicle 210 and second vehicle 220 in step 401 (i.e. the first iteration of the relational collision analysis module) at $t_0$ may include comparing the velocity data of first vehicle 210 and the velocity data of second vehicle 220 in real-time. The comparison may establish the velocity of first vehicle 210 relative to the velocity of second vehicle 220 (i.e. which vehicle is traveling at a faster speed). Similarly, comparison of the acceleration data of first vehicle 210 and the acceleration data of second vehicle 220 in the first iteration of the collision analysis module ($t_0$) may include comparing the acceleration data for first vehicle 210 with the acceleration data of second vehicle 220. The comparison may establish the acceleration of first vehicle 210 relative to the acceleration of second vehicle 220 (i.e. which vehicle is accelerating at a greater pace).

Analysis of the direction, velocity, and acceleration data for first vehicle 210 and second vehicle 220 in the first iteration of the relational collision analysis module ($t_0$) may further include plotting the data across a time period in the future, from $t_0 \ldots t_x$. The plotting of the direction, velocity, and acceleration data for first vehicle 210 and second vehicle 220 across the future time period may be subsequently used by the relational collision module to determine if a collision is imminent. The value of x (i.e. the length of the future time period) can be set to a default value. The default value may be based on an analysis of historical driving data of a plurality of drivers maintained by an interested third party, such as an insurance company, in a database. Alternatively, the future time period may be dynamically determined by the relational collision module. For example, the future time period may be based on the historical driving behavior of the drivers of one or more of first vehicle 210 and second vehicle 220. In another example, the future time period may be based on a comparison of the historical driving behavior of one or more of the drivers of first vehicle 210 and second vehicle 220 with the historical driving behavior maintained for a general population of drivers. In this instance, if historical driving data indicates that one or more of the drivers of first vehicle 210 and second vehicle 220 drives more recklessly than an average driver, the future time period may be smaller (or shorter) than if historical driving data indicates that the drivers of first vehicle 210 and/or second vehicle 220 drive less recklessly than an average driver. Similarly, in this instance, if historical driving data indicates that one or more of the drivers of first vehicle 210 and second vehicle 220 has a slower reaction time than an average driver, the future time period may be longer than if historical driving data indicates that the drivers of first vehicle 210 and/or second vehicle 220 have a faster reaction time than an average driver.

In another example, the future time period may further be based on a risk analysis of the road on which first vehicle 210 and second vehicle 220 are traveling. The risk analysis may be performed by accessing a database maintained by an interested third party, such as an insurance provider, that stores analysis of various roads. The analysis may include the actual speed limit, the average measured speed limit of drivers on the road, the average rate of accidents on the road, effects of time and/or weather on the average rate of accidents on the road, and the like. The relational collision module may then set the future time period based on one or more of the historical driving behavior of the drivers of first vehicle 210 and second vehicle 220, the historical driving behavior of a plurality of drivers, and the risk analysis of the road. For example, if first vehicle 210 and second vehicle 220 are on a first road with a first rate of accidents, a first future time period may be set by the collision detection module. If first vehicle 210 and second vehicle 220 are on a second road with a second rate of accidents higher than the first rate of accidents, a second future time period that is longer than the first future time period may be set by the collision detection module. In another example, if the risk analysis of the road indicates that a rate of accidents on a first road peaks within a select time interval, the future time period set when first vehicle 210 and second vehicle 220 are travelling on the first road within the select time interval may be longer than the future time period set when first vehicle 210 and second vehicle 220 are travelling on the first road outside of the select time period.

As indicated above, in step 402, relational collision module may determine if an accident has been detected. The determination of whether or not a collision has occurred may be based on whether or not there is an overlap in the positional data of first vehicle 210 and second vehicle 220. If there is an overlap in the positional data, the relational collision module may determine that a collision has occurred. Relational collision module may then, at step 406, trigger execution of a collections module and a post-collision module. Relational collision module may then terminate. The collections module and the post-collision module will be described in further detail below, in reference to FIGS. 6 and 8, respectively. If there is no overlap in the positional data, processing may move to step 403.

At step 403, relational collision module may determine whether a collision between first vehicle 210 and second vehicle 220 is imminent. Determining whether or not a collision is imminent may include analysis of the plotted direction, velocity, and acceleration data. A collision may be imminent if the likelihood percentage that first vehicle 210 and second vehicle 220 will collide within a predetermined time period if both vehicles continue to travel in the same, or substantially the same, direction, at the same or substantially the same, velocity and acceleration for a future time period is equal to or greater than an imminence threshold. That is, the relational collision module may determine, from the plotted data, a first projected location of first vehicle 210 at a future time if first vehicle 210 continues to travel in the same, or substantially the same, direction, velocity, and acceleration. The relational collision module may determine, from the plotted data, a second projected location of second vehicle 220 at the future time if second vehicle 220 continues to travel in the same, or substantially the same, direction, velocity, and acceleration. Based on the first projected location and the second projected location, relational collision module may determine the likelihood percentage that first vehicle 210 and second vehicle 220 will collide. If the likelihood percentage is above the imminence threshold, relational collision module may determine that an imminent collision between first vehicle 210 and second vehicle 220 has been detected.

Each of the predetermined time interval and the imminence threshold may be set to a default value. The default values may be based on an analysis of historical driving data of a plurality of drivers maintained by an interested third party, such as an insurance company, in a database. Alternatively, or additionally, each of the predetermined time interval and the imminence threshold may be dynamically determined by the relational collision module. As described above in reference to the dynamic determination of the future time period, each of the predetermined time period and the imminence threshold may be based on the historical driving behavior of the drivers of one or more of first vehicle 210 and second vehicle 220. One or more of the predetermined time period and the imminence threshold may be further based on a comparison of the historical driving behavior of one or more of the drivers of first vehicle 210 and second vehicle 220 with the historical driving behavior maintained for a general population of drivers. One or more of the predetermined time period and/or the imminence threshold may further be based on a risk analysis of the road on which first vehicle 210 and second vehicle 220 are traveling. The risk analysis may be performed by accessing a database maintained by an interested third part, such as an insurance provider, that stores analysis of various roads. The analysis may include the actual speed limit, the average measured speed limit of drivers on the road, the average rate of accidents on the road, effects of time and/or weather on the average rate of accidents on the road, and the like.

For example, in a case where a driver of first vehicle 210 has a below-average reaction time (i.e. the driver of first vehicle 210 takes longer than an average driver to react), the predetermined time period may be set to a maximum length. If the driver of first vehicle 210 has an above-average reaction time, the predetermined time period may be set to a shorter length, as it may be determined that the driver of first vehicle 210 does not need to be warned as far in advance. Similarly, if a driver of first vehicle 210 has a below-average reaction time, the imminence threshold may be set to a lower value than if the same driver of first vehicle 210 has an above-average reaction time. If the driver of first vehicle 210 has an above-average reaction time and a driver of second vehicle 220 has a below-average reaction time, the relational collision module may default to setting the imminence threshold and the predetermined time period based on the driver of second vehicle 220 (i.e. the driver that requires more warning) to minimize the chance of collision.

If a collision between first vehicle 210 and second vehicle 220 is imminent, relational collision module may, at step 407, trigger execution of a warnings module and the collections module. When triggering the warnings module and the collections module, the relational collision module may transmit a collision identification number identifying the imminent collision to the warnings module and the collections module. These modules are discussed in further detail in reference to FIGS. 5 and 6. Once the warnings module and the collections module are triggered, processing may continue to step 404. If a collision between first vehicle 210 and second vehicle 220 is not imminent, relational collision module may proceed directly from step 403 to step 404. At step 404, relational collision module may increment the value of n by 1.

At step 405, the relational collision module may perform collision analysis for the updated time value ($t_n$). The collision analysis for the updated time value ($t_n$) may be the same as the collision analysis performed at step 401 for $t_0$, but may additionally utilize the vehicle driving data and subsequent analysis performed one or more previous iterations of the collision analysis. For example, the collision analysis performed at step 405 for $t_1$ may include the vehicle driving data and the analysis results for $t_0$ from step 401. Similarly, the collision analysis performed for $t_2$ may include the vehicle driving data and the analysis results for $t_o$ and $t_1$, and the collision analysis performed for $t_n$ may include the vehicle driving data and the analysis results for $t_{n-m} \ldots t_{n-1}$. For example, the acceleration data at $t_n$ of first vehicle 210 may be compared with the acceleration data of first vehicle 210 from $t_{n-m} \ldots t_{n-1}$ to determine if first vehicle 210 is accelerating or decelerating, and the rate of acceleration/deceleration. The value of m may be set to a default value or may be dynamically determined using the same data and analysis described above in reference to selecting the future time period (one or more of the historical driving data of the drivers of first vehicle 210 and second vehicle 220, the historical driving data of a plurality of drivers, and a risk analysis of the road on which first vehicle 210 and second vehicle 220 are traveling). In one example, a streaming window may be used. That is, the oldest vehicle driving data and analysis data is removed and the most recent vehicle driving data and analysis data is added to the data set.

Another example of using data from previous iterations of the analysis includes the plotting of the direction, velocity and acceleration data. As with step 401, analysis of the direction, velocity, and acceleration data for first vehicle 210 and second vehicle 220 in step 405 may further include plotting the data across a future time period to serve as a basis for subsequently determining if a collision is imminent. As noted above, a collision may be imminent if the likelihood percentage that first vehicle 210 and second vehicle 220 will collide within a predetermined time period if both vehicles continue to travel in the same, or substantially the same, direction at the same or substantially the same, velocity and acceleration for a future time period is equal to or greater than an imminence threshold. In a first example, the plotting may be based on the vehicle driving data received for first vehicle 210 and second vehicle 220 at $t_n$. That is, relational collision module may determine a likelihood percentage of collision if first vehicle 210 and second vehicle 220 continues travelling in the same direction with the same velocity and acceleration as tn for time period $t_n \ldots t_x$. In a second example, relational collision module may include the vehicle driving data and subsequent analysis data from $t_{n-m} \ldots t_{n-1}$ in the plotting for $t_n \ldots t_x$. As discussed above, the acceleration data at $t_n$ of first vehicle 210 may be compared with the acceleration data of first vehicle 210 from $t_{n-m} \ldots t_{n-1}$ to determine if first vehicle 210 is accelerating or decelerating and the rate of acceleration/deceleration. In one scenario, it may be determined that first vehicle 210 is accelerating at a first rate and second vehicle 220 is accelerating at a second rate. The plotting may then be used to determine if the likelihood percentage of a collision, if first vehicle 210 and second vehicle 220 continue to travel in the same direction at the same rate of acceleration for time period $t_n \ldots t_x$, is above an imminence threshold.

One or more of the future time period, the predetermined time period, and the imminence threshold, may be updated in a current iteration of the collision analysis. The updated values may be based on updated historical driving data and updated risk analysis of the roads. For example, if the drivers of first vehicle 210 and second vehicle 220 are driving on a different road in a current iteration of collision analysis than in a previous iteration, one or more of the future time period, the predetermined time period, and the imminence threshold may be updated based on a risk analysis of the road in the current iteration. Once the direction, velocity, and acceleration have been plotted in step 405, processing may return to step 402. If an accident is detected in step 402 based on a positional overlap between first vehicle 210 and second vehicle 220, the collection and post-collision modules may be triggered in step 406 and the relational collision module may terminate. If a collision is determined to be imminent in step 403 based on an analysis of the plotting, the warnings and collection modules may be triggered in step 407 and processing may continue to step 404. If a collision is not determined to be imminent in step 403, processing may continue directly to step 404. In step 404, the value of n may be incremented and the entire process may repeat.

FIG. 5 is a flow diagram illustrating an example execution of a warnings module. As noted above in reference to FIG. 3, the warnings module may be triggered when the accident analysis module detects dangerous driving behavior. As further noted above in reference to FIG. 4, the warnings module may be triggered when the relational collision module determines that a collision is imminent. The warnings module may be a sub-module of accident analysis module. The warnings module may execute on the same computing platform as one or more of the accident analysis module and the relational collision module. Alternatively, the warnings module may execute on a separate computing platform than one or more of the accident analysis module and the relational collision module. In one example, the accident analysis module, the relational collision module and the warnings module may all execute on accident analysis server 250. In another example, relational collision module may execute on accident analysis server 250, while the warnings module executes on mobile devices 215 and 225. The relational collision module and the warnings may be part of the same sub-module or may be two separate sub-modules of the accident analysis module.

The warnings module may be configured such that the warnings module may access the vehicle driving data received by the accident analysis module from first vehicle 210 and second vehicle 220 in steps 301 and 302 of FIG. 3, and may further access the analysis of the relational collision module performed in steps 401-405 of FIG. 4 (the plotting of the direction, velocity, and acceleration data for the future time period, the likelihood percentage of positional overlap for the predetermined time period, and the like). When the warnings module is triggered, the warnings module may receive, at step 501, a collision identification number from the relational collision module or an incident identification number from the accident analysis module. The collision identification number or the incident identification number may be used by the warnings module in step 505, which is described below. The execution of the warnings module when triggered by the relational collision module is described below, followed by a description of the execution of the warnings module when triggered by the accident analysis module.

In step 503, the warnings module may determine which, if any, of the drivers of first vehicle 210 and second vehicle 220 are to be warned. For example, drivers or owners of both first vehicle 210 and second vehicle 220 may have configured the accident analysis module such that the driver of first vehicle 210 and the driver of second vehicle 220 is not warned if a collision is imminent. In another example, the driver of first vehicle 210 may have configured the accident analysis module such that driver of first vehicle 210 is not to be warned of any imminent collisions, while the driver of second vehicle 220 may have configured the accident analysis module such that the driver of second vehicle 220 is warned if the likelihood percentage of a collision meets a first threshold. In another example, a driver or owner of first vehicle 210 may have configured the accident analysis module such that the driver of first vehicle 210 is only warned if the likelihood percentage of a collision meets a first threshold, while a driver or owner of second vehicle 220 may have configured the accident analysis module such that the driver of second vehicle 220 is only warned if the likelihood percentage of a collision meets a second threshold. The first and second threshold may be the same or different, and may be equal to or greater than the imminence threshold used in step 403 of FIG. 4. In another example, a driver or owner of first vehicle 210 may have configured the accident analysis module such that the driver of first vehicle 210 is only warned if a collision is imminent within a first time period, while a driver or owner of second vehicle 220 may have configured the accident analysis module such that the driver of second vehicle 220 is only warned if a collision is imminent within a second time period. The first and second time period may be the same or different, and may be equal to or less than the predetermined period used in step 403 of FIG. 4. In summary, each driver or owner may select not to be warned at all, may select to be warned any time the warnings module is triggered, or may set further restrictions, such that they are only warned if likelihood percentage is above a customized threshold and/or the imminent collision is within a customized time period.

If neither the driver of first vehicle 210 or the driver of second vehicle 220 is to be warned of the imminent collision, processing terminates at step 504. If one or more of the driver of first vehicle 210 and the driver of second vehicle 220 is to be warned of an imminent collision, processing may continue to step 505, where the set of warnings for the drivers is determined. Drivers may be given warnings via audio, visual, and/or tactile feedback. These may include, but are not limited to, an audio message, an audio alarm/beeping, flashing of lights within a car, flashing/lighting one or more LED alarm lights, vibrating the steering wheel, and the like. The imminence of the collision may determine the set of warnings to be outputted. For example, one or more LEDs may flash a blue light if the likelihood percentage of an imminent collision is at a first level, and may flash a red if the likelihood percentage of an imminent collision is at a second level, where the first level is lower than the second level. In another example, the intensity of the vibration of the steering wheel may be related to the imminence of the collision (that is, a first level of a likelihood percentage of an imminent collision results in a first intensity of vibration and a second level of a likelihood percentage of an imminent collision results in a second intensity of vibration, wherein the second level and second intensity are higher than the first level and first intensity, respectively).

Additionally, the set of warnings to be deployed may be based on whether the drivers of first vehicle 210 and second vehicle 220 have been previously warned of the imminent collision. For example, the warning module may compare the collision identification number received when the warnings module was initially triggered with a set of previously received collision identification numbers for which warnings were deployed. This may be used to help the warnings module determine if the drivers of first vehicle 210 and second vehicle 220 are being given multiple warnings for the same collision. If the warnings module determines that drivers of first vehicle 210 and second vehicle 220 have been previously warned, and that the same collision is still imminent, warnings module may determine that the drivers of first vehicle 210 and second vehicle 220 are ignoring the warnings. Warnings module may then deploy a current set of warnings that is more intense (for example, louder, brighter) than a set of warnings deployed when the same collision identification number was previously received. As a result, as a collision becomes more imminent, the warnings provided to the drivers of first vehicle 210 and second vehicle 220 become more intense, thus increasing the probability that the drivers of first vehicle 210 and second vehicle 220 will take action to avoid the collision.

In one instance, a default set of warnings (such as type of warning and frequency of warning) may be given to the drivers of first vehicle 210 and second vehicle 220. Alternatively, drivers of first vehicle 210 and second vehicle 220 may have configured the warning settings to be applied within the accident analysis module. As noted above, the warnings may include audio, visual, and tactile feedback. A driver of first vehicle 210 may configure the warning setting within the accident analysis module such that all warnings are via audio feedback. A driver of second vehicle 220 may configure the warning settings within the accident analysis module such that all warnings are via visual feedback. Alternatively, a driver of second vehicle 220 may configure the warning settings within the accident analysis module such that all warnings are via any combination of audio feedback, visual feedback, and/or tactile feedback. A driver may further configure limits for the warnings. For example, a driver may set a maximum and/or minimum limit on the level of sound used for audio feedback warnings.

Alternatively, or additionally, the warnings may be determined based on a stored analysis of a driving profile of the driver. The driving profile may include characteristics of the driver, such as age, reaction time of the driver to driving events, previous warnings given to the driver, previous reactions by the driver to the warnings, and the like. The previous warnings given to the driver and stored in the driver profile may have been deployed for an imminent collision unrelated to or related to the current imminent collision. The warnings module may have previously performed trend analysis on the stored driver profile. For example, the warnings module may have previously determined, based on a trend analysis of this data, that the driver of first vehicle 210 is more likely to respond to audio feedback than visual feedback. The results of the previous trend analysis may have been previously stored within the driving profile of the driver of first vehicle 210.

Accordingly, warnings module may access the warnings settings configured by the drivers, driver profiles of the drivers to be warned, and may further determine whether a warning has previously been issued for the collision identification number received in step 501. Based on the combination of these factors, warnings module may determine a set of warnings to be applied. In step 507, the warnings module may transmit the determined set of warnings to one or more of the driver of first vehicle 210 and the driver of second vehicle 220.

As noted above, the warnings module may be a sub-module of the relational collision module, and may execute on a same computing platform as the relational collision module or a different computing platform as the relational collision module. If the warnings module is being performed by accident analysis module 214, warnings for the driver of first vehicle 210 may be transmitted directly to the necessary system components (for example, the speakers, LED lights, the steering wheel), or may be transmitted to the system components via telematics device 213. Warnings for the driver of second vehicle 220 may be transmitted from accident analysis module 214 to second vehicle 220 via one or more V2V transmittals short-range communication system 212 and short-range communication system 222. Short-range communication system 222 may then forward the received warnings to accident analysis module 224, which may transmit the received warnings to the system components of second vehicle 220 directly or via telematics device 223. Alternatively, warnings for the driver of second vehicle 220 may be transmitted from accident analysis module 214 to accident analysis server 250 via telematics device 213. Accident analysis server 250 may then forward the received warnings for the driver of second vehicle 220 to telematics device 223 or mobile device 225. Telematics device 223 or mobile device 225 may then transmit the received warnings to the system components of second vehicle 220. Alternatively, warnings for the driver of second vehicle 220 may be transmitted from accident analysis module 214 to mobile device 215, which may then forward the warnings for second vehicle 220 to mobile device 225. Mobile device 225 may then forward the received warnings for second vehicle 220 to the system components of second vehicle 220 directly or via telematics device 223.

If the warnings module is executing on mobile device 215, the warnings for first vehicle 210 may be transmitted from the mobile device 215 to the system components of first vehicle 210 directly or via telematics device 213. The warnings for second vehicle 220 may be transmitted from the mobile device 215 to mobile device 225. Mobile device 225 may then transmit the received warnings to the system components of second vehicle 220 directly or via telematics device 223. Alternatively, or additionally, mobile device 215 may transmit the warnings for second vehicle 220 to accident analysis server 250. Accident analysis server 250 may forward the warnings to second vehicle 220 via telematics device 223 or mobile device 225. Telematics device 223 may then forward the received warnings to the system components of second vehicle 220. Mobile device 225 may transmit any received warnings to the system components of second vehicle 220 directly or via telematics device 223. Alternatively, or additionally, mobile device 215 may forward the warnings for second vehicle 220 to short-range communications system 212 directly or via the accident analysis module 214. The warnings for second vehicle 220 may then be transferred to second vehicle 220 via one or more V2V transmittals between short-range communications system 212 and short-range communications system 222. The warnings received at short-range communications system 222 may be transmitted to the system components of second vehicle 220 via mobile device 225 or via telematics device 223.

If the warnings module is executing on accident analysis server 250 (for example, by accident analysis module 251), any warnings for the driver of first vehicle 210 may be transmitted to mobile device 215 and/or telematics device 213. Mobile device 215 and telematics unit 213 may then forward the received warnings to the appropriate system components of first vehicle 210. Similarly, any warnings for the driver of second vehicle 220 may be transmitted to mobile device 225 and/or telematics device 223. Mobile device 225 and telematics unit 223 may then forward the received warnings to the appropriate system components of second vehicle 220.

If the warnings module is being performed by accident analysis module 224, warnings for the driver of second vehicle 220 may be transmitted directly to the necessary system components (for example, the speakers, LED lights, the steering wheel), or may be transmitted to the system components via telematics device 223. Warnings for the driver of first vehicle 210 may be transmitted from accident analysis module 224 to first vehicle 210 via one or more V2V transmittals between short-range communication system 222 and short-range communication system 212. Short-range communication system 212 may then forward the received warnings to accident analysis module 214, which may transmit the received warnings to the system components of first vehicle 210 directly or via telematics device 213. Alternatively, warnings for the driver of first vehicle 210 may be transmitted from accident analysis module 224 to accident analysis server 250 via telematics device 223. Accident analysis server 250 may then forward the received warnings for the driver of first vehicle 210 to telematics device 213 or mobile device 215. Telematics device 213 or mobile device 215 may then transmit the received warnings to the system components of first vehicle 210. Alternatively, warnings for the driver of first vehicle 210 may be transmitted from accident analysis module 224 to mobile device 225, which may then forward the warnings for first vehicle 210 to mobile device 215. Mobile device 215 may then forward the received warnings for first vehicle 210 to the system components of first vehicle 210 directly or via telematics device 213.

If the warnings module is executing on mobile device 225, the warnings for second vehicle 220 may be transmitted from the mobile device 225 to the system components of second vehicle 220 directly or via telematics device 223. The warnings for first vehicle 210 may be transmitted from the mobile device 225 to mobile device 215. Mobile device 215 may then transmit the received warnings to the system components of first vehicle 210 directly or via telematics device 213. Alternatively, or additionally, mobile device 225 may transmit the warnings for first vehicle 210 to accident analysis server 250. Accident analysis server 250 may forward the warnings to first vehicle 210 via telematics device 213 or mobile device 215. Telematics device 213 may then forward the received warnings to the system components of first vehicle 210. Mobile device 215 may transmit any received warnings to the system components of first vehicle 210 directly or via telematics device 213. Alternatively, or additionally, mobile device 225 may forward the warnings for first vehicle 210 to short-range communications system 222 directly or via the accident analysis module 224. The warnings for first vehicle 210 may then be transferred to first vehicle 210 via one or more V2V transmittals between short-range communications system 222 and short-range communications system 212. The warnings received at short-range communications system 212 may then be transmitted to the system components of first vehicle 210 via mobile device 215 or via telematics device 213.

As noted above in reference to step 303 of FIG. 3, the warnings module may also be triggered by the accident analysis module if the driving behavior of one or more of a driver of first vehicle 210 and a driver of second vehicle 220 indicates reckless driving behavior. In this instance, the accident analysis module may include an incident identification number identifying the driving behavior that is dangerous or reckless. The warnings module in this instance may operate similar to its operation when triggered in response to a detected imminent collision. As noted above, the warnings module may be configured such that the warnings module may access the vehicle driving data received by the accident analysis module from first vehicle 210 and second vehicle 220 in steps 301 and 302 of FIG. 3. The following example is in reference to the driver of first vehicle 210, and a similar process may be performed for the driver of second vehicle 220.

Upon being triggered by the accident analysis module in response to a dangerous driving behavior (or a plurality of dangerous driving behaviors) being detected in reference to the driver of first vehicle 210, the warnings module may at step 501, receive an incident identification number identifying the particular dangerous driving behavior(s). In step 503, the warnings module may determine if the driver of first vehicle 210 is to be warned. For example, the driver of first vehicle 210 may have configured the accident analysis module such that the driver of first vehicle 210 is not warned if his or her driving behavior is dangerous. In another example, the driver of first vehicle 210 may have configured the accident analysis module such that the driver of first vehicle 210 is warned if the dangerous driving behavior is of a first type (for example, excessive straying from a lane) but is not to be warned if the dangerous driving behavior is of a second type (for example, excessive speed). In this instance, the warnings module may compare the particular driving behaviors identified in the incident identification number and cross-reference these to the configurations made by the driver.

If the driver of first vehicle 210 is not to be warned of the dangerous driving behavior, processing terminates at step 504. If the driver of first vehicle 210 is to be warned of the driving behavior, processing may continue to step 505, where the set of warnings for the drivers is determined. Drivers may be given warnings via audio, visual, and/or tactile feedback. These may include, but are not limited to, an audio message, an audio alarm/beeping, flashing of lights within a car, flashing/lighting one or more LED alarm lights, vibrating the steering wheel, and the like. Different dangerous driving behaviors may be linked to different types of warnings. For example, if a driver is speeding excessively, the driver may be warned via an audio message, whereas if the driver is straying excessively from a lane, the driver may be warned via haptic feedback (such as a vibrating steering wheel). Additionally, the intensity of the dangerous behavior may determine the set of warnings to be outputted. For example, one or more LEDs may flash a blue light if the excessive speed is above a first level, and may flash a red light if the excessive speed is above a second level, where the first level is lower than the second level. In another example, the intensity of the vibration of the steering wheel may be linearly related to the excessiveness of the speed (that is, a first level of excessive speeding results in a first intensity of vibration and a second level of excessive speed results in a second intensity of vibration, wherein the second level and second intensity are higher than the first level and first intensity, respectively).

Additionally, the set of warnings to be deployed may be based on whether the driver of first vehicle 210 has been previously warned of the dangerous driving behavior. For example, the warning module may compare the incident identification number received when the warnings module was initially triggered with a set of previously received incident identification number linked to the driver of first vehicle 210. This may be used to help the warnings module determine if the driver of first vehicle 210 has being given multiple warnings for the same incident. If the warnings module determines that driver of first vehicle 210 has been previously warned, and that the dangerous driving behavior is continuing, warnings module may determine that the driver of first vehicle 210 is ignoring the warnings. Warnings module may then deploy a current set of warnings that is more intense (for example, louder, brighter) than a set of warnings deployed when the incident identification number was previously received. As a result, as the dangerous driving behavior becomes more intense or prolonged, the warnings provided to the driver of first vehicle 210 become more intense, thus increasing the probability that the driver of first vehicle 210 will take action to terminate the dangerous driving behavior.

As discussed above, the driver of first vehicle 210 may have configured the accident analysis module with particular warning-related settings. For example, the driver of first vehicle 210 may have requested that all warnings be issued via audio feedback, or that no visual warnings be given. As further discussed above, the warnings may additionally or alternatively be determined based on a stored analysis of a driving profile of the driver of first vehicle 210. For example, the warnings module may have previously performed trend analysis and determined that the driver of first vehicle 210 is more likely to stop straying from a lane when warned via haptic feedback than when warned via an audio message, whereas the same driver is more likely to stop speeding excessively when warned via an audio message than when warned via haptic feedback. The results of the previous trend analysis may have been previously stored within the driving profile of the driver of first vehicle 210. Accordingly, warnings module may access the warning settings configured by the driver of first vehicle 210, determine whether a warning has previously been issued for the current incident identification number and may further access the driver profile of the driver of first vehicle 210. Based on the combination of these factors, warnings module may determine a set of warnings to be applied based on the incident identification number. In step 507, the warnings module may transmit the determined set of warnings to the driver of first vehicle 210. The set of warnings may be transmitted using the same procedure discussed above in reference to the triggering of the warnings module by the relational collision module.

FIG. 6 is a flow diagram illustrating an example execution of a collections module. As discussed above in reference to FIG. 3, the collections module may be triggered in step 303 if a driver of one or more of first vehicle 210 and second vehicle 220 is exhibiting dangerous driving behavior. As described above in reference to FIG. 4, the collections module may be triggered in step 406 if a collision between first vehicle 210 and second vehicle 220 is detected, or in step 407, if a collision between first vehicle 210 and second vehicle 220 is imminent. The collections module may be a sub-module of the accident analysis module. The collections module may execute on the same computing platform as one or more of the accident analysis module, the relational collision module, and the warnings module. Alternatively, the warnings module may execute on a separate computing platform than one or more of the accident analysis module, the relational collision module, and the warnings module. The relational collision module, the warnings module, and the collections module may be part of the same sub-module of the accident analysis module or may be separate sub-modules of the accident analysis module.

The collections module may be configured such that the collections module may access the vehicle driving data received by the accident analysis module from first vehicle 210 and second vehicle 220 in steps 301 and 302 in FIG. 3, and may further access the analysis of the relational collision module performed in steps 401-405 of FIG. 4 (the plotting of the direction, velocity, and acceleration data for the future time period, the likelihood percentage of positional overlap for the predetermined time period, and the like). In addition, when triggered, the collections module may receive, at step 601, a collision identification number from the relational collision module or an incident identification number from the accident analysis module. A collision identification number sent from the relational collision module to the collections module in step 601 may correspond to the collision identification number sent from the relational collision module to the warnings module in step 501 of FIG. 5. Similarly, an incident identification number sent from the accident analysis module to the collections module in step 601 may correspond to the incident identification number sent from the accident analysis module to the warnings module in step 501 of FIG. 5. The collision identification number or the incident identification number may be used by the collections module as described in further detail below.

In step 603, the collections module may initiate data collection for local vehicles. Local vehicles are vehicles that are involved in the detected collision or the vehicles for which a collision is imminent, such as first vehicle 210 and second vehicle 220. Alternatively, the local vehicle may be the vehicle that is exhibiting dangerous driving behavior, such as first vehicle 210 or second vehicle 220. Initiating data collection for first vehicle 210 and second vehicle 220 may comprising transmitting a request for vehicle driving data to the accident analysis module, which previously received and stored vehicle driving data of first vehicle 210 and second vehicle 220 in each iteration of steps 301 and 302 of FIG. 3. The request for data from the collections module may specify the time frame for which vehicle driving data is to be collected. For example, the request for data may specify a first collections time and a second collections time. If the collections module was triggered at step 406 in FIG. 4, the first collections time may represent a period of time prior to the time the collision between first vehicle 210 and second vehicle 220 was detected, and the second collections time may represent a period of time subsequent to the time the collision between first vehicle 210 and second vehicle 220 was detected. If the collections module was triggered at step 408 in FIG. 4, the first collections time may represent a period of time prior to the time an imminent collision between first vehicle 210 and second vehicle 220 was detected and the second collections time may represent a period of time subsequent to the time the imminent collision between first vehicle 210 and second vehicle 220 was detected. If the collections module was triggered at step 304 in FIG. 3, the first collections time may represent a period of time prior to the dangerous driving behavior was detected, and the second collections time may represent a period of time subsequent to the time the dangerous driving behavior was detected. Alternatively, the collections module can transmit the request for vehicle driving data for the time frame directly to first vehicle 210 and second vehicle 220.

In one instance, the time frame for which data is to be collected may be configured by the driver of first vehicle 210 and/or the driver of second vehicle 220. In another instance, the time frame for which data is to be collected may be configured by an interested third party, such as an insurance company. In response to the request, the collections module may receive vehicle driving data for first vehicle 210 and second vehicle 220 from the accident analysis module for a time frame between the first collections time and the second collections time.

If the accident analysis module does not have vehicle driving data for the time frame specified in the collections request, the collections module data may access the vehicle driving data via one or more of mobile device 215, telematics device 213, mobile device 225, and telematics device 223. The collections module may send one or more additional requests for vehicle driving data to one of the aforementioned devices. The request may include the time frame included in the request to the accident analysis module. Alternatively, the time frame in the second request to one or more of mobile device 215, telematics device 213, mobile device 225, and telematics device 223 may be a different time frame than the time frame in the request to the accident analysis module (for example, a time period for which the accident analysis module did not have the requested vehicle driving data).

For example, the collections module may send a first request for vehicle driving data for first vehicle 210 and second vehicle 220 for a first time frame to the accident analysis module. The accident analysis module may return a first set of vehicle driving data corresponding to vehicle driving data for first vehicle 210 and second vehicle 220 for a first subset of the first time frame, and may further return a message that the accident analysis module does not have the vehicle driving data for the remaining time. The collections module may then determine a second time frame that represents the period of time for which no vehicle driving data was received (i.e. if the first time frame was from 0.1 ms to 0.8 ms, the accident analysis may return data from 0.1 ms to 0.6 ms, which is the first subset of time, and the collections module may determine that the second subset of time is 0.61 ms to 0.8 ms). The collections module may then send additional requests to mobile device 215 and/or telematics device 213 for vehicle driving data for first vehicle 210 for the second subset of time. For example, the collections module may send a first additional request to mobile device 215 for a first vehicle driving data for the second subset of time for first vehicle 210, and a second additional request to telematics device 213 for a second vehicle driving data and third vehicle driving data for the second subset of time for first vehicle 210. Alternatively, or additionally, the collections module may further send additional request(s) to mobile device 225 and/or telematics device 223 for vehicle driving data for second vehicle 220 for the second subset of time. For example, the collections module may send a third additional request to mobile device 225 for a third vehicle driving data for the second subset of time for second vehicle 220, and a fourth additional request to telematics device 223 for a fourth vehicle driving data and fifth vehicle driving data for the second subset of time for second vehicle 220. One or more of mobile devices 215 and 225, and telematics devices 213 and 223 may then return the requested vehicle driving data.

The collections module may store the vehicle driving data received from one or more of the accident analysis module, mobile device 215, telematics device 213, mobile device 225, and telematics device 223 on the computing platform on which it is executing. The collections module may tag the stored vehicle driving data with the received corresponding collision identification number or incident identification number. The collections module may further forward the tagged vehicle driving data to accident analysis server 250 for subsequent processing.

In step 605, the collections module may collect vehicle driving data and infrastructure data from nearby vehicles and/or wireless devices. In a scenario shown in FIG. 7A, a collision may be detected between first vehicle 710 and second vehicle 720. Third vehicle 730 and fourth vehicle 740 may be located within a first vicinity of first vehicle 710 and second vehicle 720. Fifth vehicle 750 may be located within a second vicinity of fourth vehicle 740.

First vehicle 710 may the same as first vehicle 210 and second vehicle 720 may be the same as second vehicle 220. First vehicle 710 may include or more vehicle sensors 711, short-range communications system 712, accident analysis module 714, telematics device 713, and a mobile device 715 within the first vehicle 710. Second vehicle 720 may include or more vehicle sensors 721, short-range communications system 722, accident analysis module 724, telematics device 723, and a mobile device 725 within the second vehicle 710. Third, fourth, and fifth vehicles 730, 740, and 750, may each be configured similar to first vehicle 210 and second vehicle 220. That is, third vehicle 730 may include one or more vehicle sensors 731, short-range communications system 732, accident analysis module 734, telematics device 733, and a mobile device 735 within the third vehicle 730. Fourth vehicle 740 may include one or more vehicle sensors 741, short-range communications system 742, accident analysis module 744, telematics device 743, and a mobile device 745 within the fourth vehicle 740. Fifth vehicle 750 may include one or more vehicle sensors 751, short-range communications system 752, accident analysis module 754, telematics device 753, and a mobile device 755 within fifth vehicle 750.

Each of these components may be configured similar to the corresponding components of first vehicle 210 and second vehicle 220 as discussed above with reference to FIG. 2. For example, sensors 731 may be configured to transmit data to mobile device 735, either directly or via telematics device 733 in the third vehicle 730. Software applications executing on mobile device 735 may be configured to detect certain driving data independently and/or may communicate with sensors 731 to receive additional driving data. Mobile device 735 may be equipped with movement sensors, such as an accelerometer, gyroscope, speedometer, and/or GPS receivers, and may determine vehicle location, speed, acceleration, direction and other basic driving data without needing to communicate with the first vehicle sensors or any vehicle system of third vehicle 730. Alternatively, software on mobile device 735 may be configured to receive some or all of the driving data collected by sensors 731. Mobile devices 741 and 751, and fourth vehicle 740 and fifth vehicle 750 may be similarly configured.

In this scenario, a collections module executing on mobile device 715 may receive a trigger from a relational collision module, along with a collision identification number. The collections module executing on mobile device 715 may send a first trigger to the mobile device 715 and a second trigger to the short-range communications system 712, along with the collision identification number received from the relational collision module.

In response to the first trigger, mobile device 715 may broadcast a wireless communication throughout a first vicinity of where the detected collision occurred in order to locate one or more additional wireless devices within the first vicinity. The first vicinity may be a first radius that is set by the driver of first vehicle 710 or by an interested third party, such as an insurance party. Mobile device 715 may initiate a wireless communication session with the one or more additional wireless devices. The communication session may to be used to exchange one or more communications between mobile device 715 and the one or more additional wireless devices.

In response to the second trigger, short-range communications system 712 may broadcast a vehicle-to-vehicle (hereinafter "V2V") message throughout a second vicinity of where the detected collision occurred in order to locate one or more additional vehicles within the second vicinity. The second vicinity may be a second radius that is set by the driver of first vehicle 710 or by an interested third party, such as an insurance party. The first radius may be greater than, equal to, or smaller than the second radius. Short-range communications system 712 may initiate a communications with one or more located vehicles in the vicinity using any of the protocols described above in reference to FIG. 1. The V2V communications may be used to exchange one or more communications between short-range communications system 712 and the located nearby vehicles.

Additionally, short-range communications system 712 may broadcast a V2I message throughout a third vicinity of where the detected collision occurred in order to locate one or more nearby infrastructure elements, such as toll booths, rail road crossings, and road-side traffic monitoring devices. These non-vehicle receiving devices may each include one or more cameras. The one or more cameras may each take still images or video images. The one or more cameras may take the still images or the video in real-time, at periodic time intervals, or upon receiving a request to do so by an external computing element. The one or more cameras may locally store the still images or the video as image files and video files.

The message sent from short-range communications system 712 may include the collision identification number and a request for any still images or video stored by the one or more cameras for the time frame. The one or more cameras may each tag any locally stored image files and video files with the collision identification number and information identifying the camera. If the one or more cameras do not have any stored still images or video files for the time frame indicated in the request, the one or more cameras may take still images or video files upon receiving the request and locally store the still images and video files as image files and video files. The one or more cameras may each then tag the stored image files and video files with the collision identification number and information identifying the camera. The one or more cameras may each upload the tagged image files or video files to accident analysis server 250 directly or via one or more additional computing devices. Alternatively, the one or more cameras may each transmit the tagged image files and video files to the short-range communications system 712, which may then upload the received tagged image or video files to accident analysis server 250. In an alternative scenario, the one or more cameras may tag the image files and the video files with information identifying the camera, and transmit the tagged image files and the tagged video files to short-range communications system 712. Short-range communications system 712 may then further tag the received tagged image files and tagged video files with the collision identification number.

Additionally, one or more of the nearby infrastructure elements may, in response to the received V2I message, broadcast a message one or more vehicles that are within a select vicinity of the one or more of the nearby infrastructure elements. The one or more vehicles that are within the select vicinity of a nearby infrastructure element may be outside of the second vicinity. In response to receiving the message broadcast by an infrastructure element, one or more vehicles within the select vicinity may transmit vehicle driving data to the infrastructure element via one or more V2I messages. The infrastructure element may tag the received vehicle driving data with the collision identification number and upload the tagged vehicle driving data to accident analysis server 250 directly or via one or more additional computing devices. Alternatively, the infrastructure element may transmit the tagged vehicle driving data to the short-range communications system 712, which may then upload the tagged vehicle driving data to accident analysis server 250.

As noted above, in response to the first trigger, mobile device 715 may broadcast a wireless communication throughout a first vicinity of where the detected collision occurred in order to locate one or more additional wireless devices within the first vicinity. In this scenario, mobile device 715 may initiate a wireless communication session with wireless device 735 and a wireless device 745. Wireless device 735 and wireless device 745 may be located in third vehicle 730 and fourth vehicle 740, respectively. The use of two wireless devices is merely illustrative and mobile device 715 many initiate a wireless communication session with any number of wireless devices. Mobile device 715 may transmit a request for vehicle driving data to each of wireless device 735 and wireless device 745. The request for vehicle driving data may include the collision identification number and the time frame for which vehicle driving data is to be collected.

Wireless device 735 may receive the collision identification number and the time frame for which vehicle driving data for the third vehicle 730 is requested. Wireless device 735 may retrieve vehicle driving data for the third vehicle 730 for the time frame. Wireless device 735 may then tag the vehicle driving data with data identifying the third vehicle 730, as well as with the collision identification number. Wireless device 735 may then upload the tagged vehicle driving data for the third vehicle 730 for the time frame to accident analysis server 250 for subsequent processing either directly or via telematics device 733 within the third vehicle 730. Alternatively, wireless device 735 may then transmit the tagged vehicle driving data for third vehicle 730 to mobile device 715 via one or more wireless communications. Mobile device 715 may transmit the tagged vehicle driving data for third vehicle 730 to accident analysis server 250 directly or via telematics device 713.

Wireless device 745 may receive the collision identification number and the time frame for which vehicle driving data for the fourth vehicle 740 is requested. Wireless device 745 may retrieve vehicle driving data for the fourth vehicle 740 for the time frame. Wireless device 745 may then tag the vehicle driving data with data identifying the fourth vehicle 740, as well as with the collision identification number. Wireless device 745 may then transmit the tagged vehicle driving data for the fourth vehicle 740 to first vehicle 710 via one or more V2V communications. For example, wireless device 745 may transmit the tagged vehicle driving data for fourth vehicle 740 for the time period to short-range communications system 742, which may transmit the tagged data to first vehicle 710 via one or more V2V communications with short-range communications system 712 and/or mobile device 715. Mobile device 715 may upload the tagged vehicle driving data received for fourth vehicle 740 via V2V communications to accident analysis server 250 directly or via telematics device 713. Short-range communications system 712 may forward the received tagged vehicle driving data of the fourth vehicle 740 to mobile device 715 or telematics device 713. Mobile device 715 or telematics device 713 may then transmit the tagged vehicle driving data of the fourth vehicle 740 to accident analysis server 250 for subsequent processing.

Wireless device 715 may send wireless device 745 an additional request to broadcast a wireless message throughout a fourth vicinity of the fourth vehicle 740 in order to locate one or more additional wireless devices within the fourth vicinity of the fourth vehicle 740. The fourth vicinity may be a fourth radius that is set by the driver of first vehicle 710 or by an interested third party, such as an insurance party. The fourth radius may be greater than, equal to, or smaller than the first radius, the second radius, and/or the third radius. Wireless device 745 may then broadcast a wireless message throughout the fourth vicinity of the fourth vehicle 740 in order to locate one or more additional wireless devices within the fourth vicinity of the fourth vehicle 740. Wireless device 745 may initiate a communications with the wireless device 755 within fifth vehicle 750. Wireless device 755 may be within the fourth radius. Wireless device 745 may send wireless device 755 a request, via wireless communication, for vehicle driving data of the fifth vehicle 750 for the time frame. The request for vehicle driving data may include the collision identification number and the time frame for which the vehicle driving data is requested. Wireless device 755 may retrieve the vehicle driving data for the fifth vehicle 750 for the time frame. Wireless device 755 may tag the retrieved data with the collision identification number and with information identifying the fifth vehicle 750. Wireless device 755 may upload the tagged vehicle driving data for the fifth vehicle 750 to accident analysis server 250 directly or via telematics device 753 within the fifth vehicle 750.

Alternatively, wireless device 755 may transmit the tagged vehicle driving data for the fifth vehicle 750 to wireless device 745 via one or more wireless communications. Wireless device 745 may then upload the tagged vehicle driving data for the fifth vehicle 750 to accident analysis server 250 directly or via telematics device 743 within the fourth vehicle 740. Alternatively, wireless device 745 may transmit the tagged vehicle driving data for fifth vehicle 750 to wireless device 715 via one or more wireless communications and/or short-range communications system 712 via one or more V2V communications. Wireless device 715 may upload any tagged vehicle driving data for fifth vehicle 750 to accident analysis server 250 directly or via telematics device 713. Short-range communications system 712 may upload any tagged vehicle driving data for fifth vehicle 750 to accident analysis server 250 via telematics device 713 or mobile device 715.

Wireless device 745 may, via the broadcasted wireless message, simultaneously establish wireless connections with additional nearby wireless devices within the fourth radius. Wireless device 745 may simultaneously receive tagged vehicle driving data for the vehicles associated with the additional nearby wireless devices from the additional nearby wireless devices. Wireless device 745 may transmit the received tagged vehicle driving data for each of the additional nearby vehicles within the fourth radius using the same process described above. Alternatively, once the tagged vehicle driving data from fifth vehicle 750 has been uploaded to accident analysis server 250, wireless device 745 may broadcast a second wireless message and establish a wireless connection with a sixth wireless device within the fourth radius. Wireless device 745 may receive tagged vehicle driving data for a vehicle associated with the sixth wireless device, which may be uploaded to accident analysis server 250 using a process similar to that described above.

As noted above, in response to the second trigger, short-range communications system 712 may broadcast a V2V message throughout the second vicinity of the detected collision in order to locate one or more additional vehicles within the second vicinity of first vehicle 710. In response to the V2V message broadcast by short-range communications system 712, short-range communications system 712 may establish a V2V communications session with short-range communications system 732 associated with third vehicle 730 and with short-range communications system 742 associated with the fourth vehicle 740. Short-range communications system 732 and short-range communications system 742 may each be of the same type as short-range communications system 712.

Short-range communications system 712 may send the short-range communications system 732 a first request for vehicle driving data of the third vehicle 730 and for nearby infrastructure data. The first request for vehicle driving data may include the collision identification number and the time frame for which the vehicle driving data and the nearby infrastructure data is requested. The short-range communications system 732 may retrieve the vehicle driving data for the third vehicle 730 for the time frame. The short-range communications system 732 may tag the retrieved vehicle driving data with the collision identification number and with information identifying the third vehicle 730. The short-range communications system 732 may further broadcast a V2I message requesting infrastructure data for the time frame. In response to the broadcast V2I message, short-range communications system 732 may receive one or more image files and/or video files that are tagged with at least information identifying the camera that produced the image file or video file. Short-range communications system 732 may analyze each received image file and/or video file to determine if each file is tagged with the collision identification number. If a received image file or video file is not already tagged with the collision identification number, short-range communications system 732 may tag that file with the collision identification number. The short-range communications system 732 may then upload the tagged vehicle driving data and the tagged nearby infrastructure data for the third vehicle 730 for the time frame to accident analysis server 250 via telematics device 733 or via mobile device 735 within the vehicle.

Short-range communications system 712 may send the short-range communications system 742 a second request for vehicle driving data of the fourth vehicle 740 and for nearby infrastructure data. The second request for vehicle driving data may include the collision identification number and the time frame for which the vehicle driving data and the nearby infrastructure data is requested. The short-range communications system 742 may retrieve the vehicle driving data for the fourth vehicle 740 for the time frame. The short-range communications system 742 may tag the retrieved data with the collision identification number and with information identifying the fourth vehicle 740. The short-range communications system 742 may further broadcast a V2I message requesting infrastructure data for the time frame. In response to the broadcast V2I message, short-range communications system 742 may receive one or more image files and/or video files that are tagged with at least information identifying the camera that produced the image file or video file. Short-range communications system 742 may analyze each received image file and/or video file to determine if each file is tagged with the collision identification number. If a received image file or video file is not already tagged with the collision identification number, short-range communications system 742 may tag that file with the collision identification number. The short-range communications system 742 may then transmit the tagged vehicle driving data and the tagged nearby infrastructure data for the fourth vehicle 740 to short-range communications system 712 via one or more V2V communications. Short-range communications system 712 may then upload the received tagged vehicle driving data and the tagged nearby infrastructure data for the fourth vehicle 740 to accident analysis server 250 via telematics device 713 or mobile device 715.

Short-range communications system 712 may send the short-range communications system 742 an additional request to broadcast a V2V message throughout a fifth vicinity of the fourth vehicle 740 in order to locate one or more additional vehicles within the fifth vicinity of the fourth vehicle 740. The fifth vicinity may be a fifth radius that is set by the driver of first vehicle 710, fourth vehicle 740, or by an interested third party, such as an insurance party. The fifth radius may be greater than, equal to, or smaller than the first radius, the second radius, the third radius, the fourth radius, and/or the fifth radius. The short-range communications system 742 may then broadcast a V2V message throughout the fifth vicinity of the fourth vehicle 740 in order to locate one or more additional vehicles within the fifth vicinity of the fourth vehicle 740. The short-range communications system 742 may then initiate a V2V communications with short-range communications system 752 associated the fifth vehicle 750. The fifth vehicle 750 may be within the fifth radius of fourth vehicle 740. The short-range communications system 742 may send the short-range communications system 752 a request, via V2V communication, for vehicle driving data and nearby infrastructure data of the fifth vehicle 750 for the time frame.

The short-range communications system 752 may retrieve the vehicle driving data for the fifth vehicle 750 for the time frame. The short-range communications system 752 may tag the retrieved data with the collision identification number and with information identifying the fifth vehicle 750. The short-range communications system 752 may further broadcast a V2I message requesting infrastructure data for the time frame. In response to the broadcast V2I message, short-range communications system 752 may receive one or more image files and/or video files that are tagged with at least information identifying the camera that produced the image file or video file. Short-range communications system 752 may analyze each received image file and/or video file to determine if each file is tagged with the collision identification number. If a received image file or video file is not already tagged with the collision identification number, short-range communications system 752 may tag that file with the collision identification number. The short-range communications system 752 may upload the tagged vehicle driving data and the tagged nearby infrastructure data for the fifth vehicle 750 to accident analysis server 250 via mobile device 755 or telematics device 753.

Alternatively, the short-range communications system 752 may transmit the tagged vehicle driving data and the tagged nearby infrastructure data for the fifth vehicle 750 to the short-range communications system 742 via one or more V2V communications. The short-range communications system 742 may then upload the tagged vehicle driving data and the tagged nearby infrastructure data for the fifth vehicle 750 to accident analysis server 250 via mobile device 745 or telematics device 743. Alternatively, short-range communications system 742 may transmit the tagged vehicle driving data and the tagged nearby infrastructure data for the fifth vehicle 750 to short-range communications system 712 via one or more V2V communications. Short-range communications system 712 may then upload the tagged vehicle driving data and the tagged nearby infrastructure data for the fifth vehicle 750 to accident analysis server 250 via telematics device 713 or mobile device 715.

The short-range communications system 742 may, via the V2V message broadcast in response to message received from short-range communications system 712, simultaneously establish V2V connections with additional nearby vehicles within the fourth radius, and receive and transmit tagged vehicle driving data for each of the other nearby vehicles within the fourth radius using the same process described above. Alternatively, once the vehicle driving data from the fifth vehicle 750 has been uploaded to accident analysis server 250, the short-range communications system 742 may broadcast a second V2V message and establish a second V2V communication session with a sixth vehicle within the fourth radius. Tagged vehicle driving data for the sixth vehicle may be received by short-range communications system 742 from the sixth vehicle and uploaded to accident analysis server 250 using the same process described above.

In this scenario, collections module is executing on mobile device 715, and a collision has been detected between first vehicle 710 and second vehicle 720. In another example, dangerous driving behavior may have been detected by first vehicle 710 and second vehicle 720. The nearby collection of data may be performed using the same process described in reference to step 605, but may be based on the incident identification number (identifying the particular driving behavior that is deemed to be reckless and dangerous and time frame at which the particular driving behavior was detected) instead of the collision identification number.

In another example, collections module may execute on mobile device 725, and vehicle driving data for nearby vehicles may be collected using the same process described in the example above (i.e. as when collections module is executing on mobile device 715). In another example, collections module may execute on accident analysis server 250. In this example, when triggered, the collections module may send a first message to mobile device 715 and/or first vehicle 710 via telematics device 713. The collections module may send a second message to mobile device 725 and/or second vehicle 702 via telematics device 723.

Once mobile device 715 receives the first message from accident analysis server 250, local data collection and nearby data collection may then be performed as discussed above in reference to step 603 and 605. Once telematics device 713 receives the first message from accident analysis server 250, telematics device 713 may send a first trigger to mobile device 715 and a second trigger to short-range communications system 713. Mobile device 715 and short-range communications system 713 may respond to the first trigger and the second trigger, respectively, as discussed above in reference to steps 603 and 605.

Once mobile device 725 receives the second message from accident analysis server 250, local data collection and nearby data collection may then be performed as discussed above in reference to mobile device 715 in steps 603 and 605. Once telematics device 723 receives the second message from accident analysis server 250, telematics device 723 may send a first trigger to mobile device 725 and a second trigger to short-range communications system 723. Mobile device 725 and short-range communications system 723 may respond to the first trigger and the second trigger, respectively, as discussed above in reference to mobile device 715 and short-range communications system 713 in steps 603 and 605.

Figure 8:
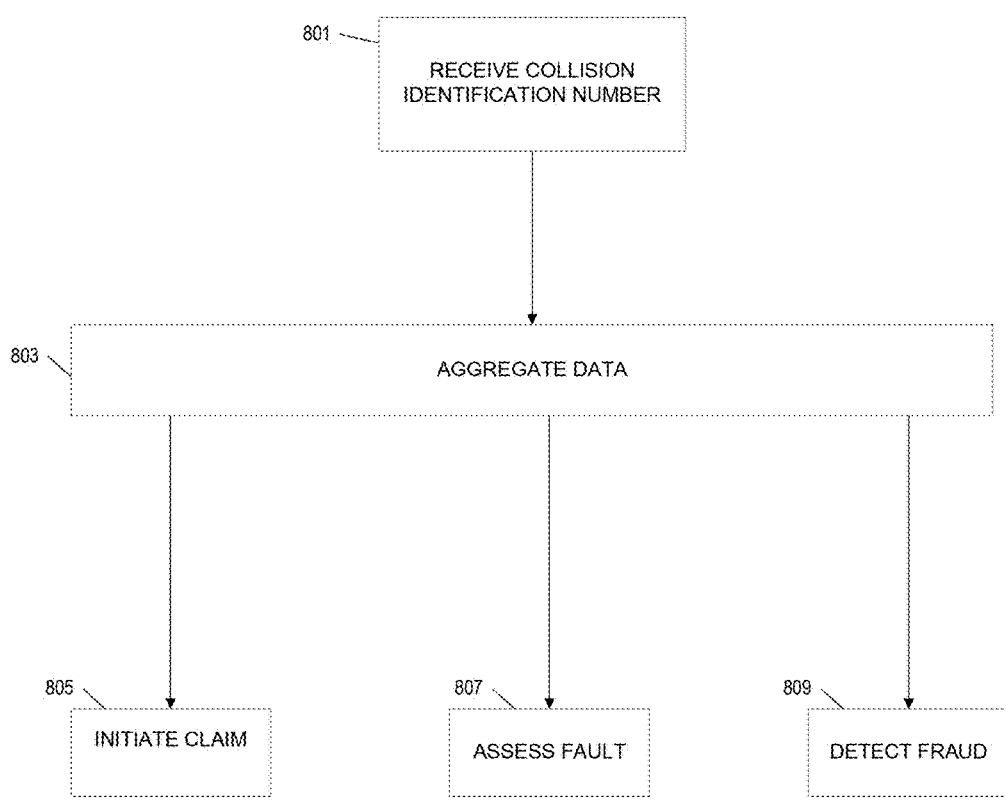
FIG. 8 is a flow diagram illustrating an example method of executing the post-collision module according to one or more aspects described herein.

FIG. 8 is a flow diagram illustrating an example method of executing the post-collision module. The post-collision module may be a sub-module of the accident analysis module. The post-collision module may be integrated with or separate from one or more of the warnings module, the relational collision module, and the collections module. The post-collision module may run on the same computing platform as one or more of the accident analysis module, the warnings module, the relational collision module, and the collections module. The post-collisions module may execute on any of mobile device 215, accident analysis module 214, mobile device 225, accident analysis module 224, and accident analysis server 250. In the example below, the post-collisions module is executing on accident analysis server 250.

When triggered in step 406 (shown in FIG. 4), the post-collisions module may receive, from the relational collision module, the collision identification number in step 801. Upon receiving the collision identification number, the collisions module may create an initial collision file within accident analysis module 251. The collision file may include the collision identification number. The post-collision module may, at step 803, begin to aggregate vehicle driving data and infrastructure data tagged with the collision identification number. As noted in reference to FIGS. 6-7B, this information may have been uploaded to accident analysis server 250 by one or more of mobile devices 715, 725, 735, 745, 755, and by one or more of vehicles 710, 720, 730, 740, and 750 (via telematics devices 713, 723, 833, 743, and 750 and/or mobile devices 715, 725, 735, 745, 755, respectively). Post-collision module may aggregate the received vehicle driving data and infrastructure data tagged with the collision identification number and aggregate the information within the collision file. If any other vehicle driving data or infrastructure data is needed, the post-collision file may request the data from one or more of mobile devices 715, 725, 735, 745, 755, and vehicles 710, 720, 730, 740, and 750.

The post-collisions module may, at step 805, use the aggregated information to initiate a claim on behalf of one or more of the driver of first vehicle 710 and the driver of second vehicle 720. For example, the post-collisions module may initiate a claim for the driver of first vehicle 710. The post-collisions module may include basic information regarding the collision based on the tagged data in the collision file. This may include any of the tagged vehicle driving data provided by first vehicle 710, second vehicle 720, third vehicle 730, fourth vehicle 740, and fifth vehicle 750. For example, based on the location data provided by the vehicles, post-collisions module may be able estimate the location of the collision. From the tagged vehicle driving data in the collision file, post-collisions module may be able to determine the speed at which first vehicle 710 and second vehicle 720 were driving at the time of the collision, whether there was any sudden acceleration or braking by first vehicle 710 or second vehicle 720, whether any of first vehicle 710 or second vehicle 720 was attempted to make a turn, the estimated cost of repair, and the like. Additionally, post-collisions module may extract any additional information provided from sensors 711 (such as the information discussed above in reference to sensors 211 and 221 in FIG. 2).

The post-collisions module may, at step 807, use the aggregated information to assess fault in the collision between first vehicle 710 and second vehicle 720. Determining fault may include analyzing the tagged vehicle driving data locally collected by first vehicle 710 and second vehicle 720 and the tagged vehicle driving data collected by nearby vehicles and wireless devices (such as the tagged vehicle driving data from third vehicle 730, fourth vehicle 740, and fifth vehicle 750), with a set of fault detection rules. For example, the set of fault detection rules may indicate that a moving vehicle is at fault or at least likely to be at fault. When applied to the tagged vehicle driving data in the collision file, analysis may indicate that first vehicle 710 was stationary while second vehicle 720 was moving, thus indicating that second vehicle 720 was likely to be at fault.

In another example, the set of fault detection rules may indicate that a vehicle driving at a faster speed than another vehicle may be at fault, or at least likely to be at fault. When applied to the tagged vehicle driving data in the collision file, analysis may indicate that prior to the collision between first vehicle 710 and second vehicle 720, first vehicle 710 was exceeding the speed limit, while second vehicle 720 was driving at the speed limit. Thus, post-collisions module may determine that first vehicle 710 was likely to be at fault. Similarly, the fault detection rules may indicate that if a vehicle is attempting to make a right turn on a red light, the vehicle is more likely to be at fault. Based on the photos taken by the infrastructure elements in the vicinity of the collision, the post-collisions module may determine that first vehicle 710 was attempting to make a right turn at a red-light, and thus is more likely to be at fault.

The post-collisions module may, at step 809, use the aggregated information to determine if there was potential fraud by one or more of the drivers of first vehicle 710 and second vehicle 720. The fraud analysis may be based on one or more of the tagged vehicle driving data from first vehicle 710, second vehicle 720, third vehicle 730, fourth vehicle 740, and fifth vehicle 750. For example, if a driver of first vehicle 710 claims damage to the front end of first vehicle 710, the post-collisions module may analyze the tagged vehicle driving data within the collision file to determine where the point of impact for first vehicle 710 occurred. Similarly, if a driver of first vehicle 710 claims excessive damage to the rear bumper of first vehicle 710, the post-collision module may analyze the tagged vehicle driving data within the collision file to determine the severity of impact (based on sensor data from first vehicle 710 and second vehicle 720, speed data of first vehicle 710 and second vehicle 720, on acceleration data of first vehicle 710 and second vehicle 720, on braking data of first vehicle 710 and second vehicle 720, and the like). The post-collisions module may further use the photos taken by infrastructure elements within a vicinity of the collision to compare the damage to the car in the photos to the damage claimed by the driver of the car to determine the driver is making a fraudulent damage claim.

Steps 805, 807, and 809 may be performed at different times or in parallel. Additionally, as more information is received and aggregated by post-collisions module, steps 805, 807, and 809 can be repeated using the received data. The output from steps 805, 807, and 809 may be used by an insurance company to increase premiums, offer a settlement, decline to offer a settlement, cover the cost of repairs, decline to cover the cost of repairs, and the like.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. A driving analysis computing device installed in a first vehicle, the driving analysis computing device comprising:
one or more processors; and
a memory unit storing computer-executable instructions, which when executed by the one or more processors, cause the driving analysis computing device installed in the first vehicle to:
detect a collision between the first vehicle and a second vehicle;
retrieve first vehicle driving data collected by first vehicle operation sensors within the first vehicle;
receive, from the second vehicle, second vehicle driving data collected by second vehicle operations sensors within the second vehicle;
transmit, from the first vehicle and to a third vehicle within a first radius of the first vehicle, a first vehicle-to-vehicle (V2V) communication comprising a first request for vehicle driving data collected by third vehicle operation sensors within the third vehicle;
receive, from the third vehicle and by the first vehicle, a second V2V communication comprising third vehicle driving data collected by the third vehicle operation sensors within the third vehicle;
transmit, from the first vehicle and to the third vehicle, a third V2V communication comprising a second request for vehicle driving data for one or more vehicles that are within a second radius of the third vehicle;
receive, from the third vehicle and in response to the third V2V communication comprising the second request for vehicle driving data, fourth vehicle driving data collected by fourth vehicle operations sensors within a fourth vehicle that is within the second radius of the third vehicle, wherein the fourth vehicle driving data is sent by the fourth vehicle to the third vehicle; and
transmit the first vehicle driving data, the second vehicle driving data, the third vehicle driving data, and the fourth vehicle driving data to a server.

2. The driving analysis computing device of claim 1, wherein the fourth vehicle driving data is received via a fourth V2V communication between the first vehicle and the third vehicle.

3. The driving analysis computing device of claim 1, the memory unit storing computer-executable instructions, which when executed by the one or more processors, further cause the driving analysis computing device to:
transmit the first vehicle driving data, the second vehicle driving data, the third vehicle driving data, and the fourth vehicle driving data to the server via a telematics device.

4. The driving analysis computing device of claim 1, the memory unit storing computer-executable instructions, which when executed by the one or more processors, further cause the driving analysis computing device to:
determine a time frame associated with the collision between the first vehicle and the second vehicle;
transmit, to one or more infrastructure elements within a second radius of the first vehicle, and via a first vehicle-to-infrastructure ("V2I") communication between the first vehicle and the one or more infrastructure elements, a request for image files for the time frame;
receive, from one or more infrastructure elements and via a second V2I communication between the first vehicle and the one or more infrastructure elements, image files associated with the time frame;
tag the image files with a collision identification number associated with the collision between the first vehicle and the second vehicle; and
transmit the tagged image files to the server.

5. The driving analysis computing device of claim 1, the memory unit storing computer-executable instructions, which when executed by the one or more processors, further cause the driving analysis computing device to:
transmit, to the third vehicle and via a fourth V2V communication between the first vehicle and the third vehicle, a request for image files from infrastructure elements that are within a second radius of the third vehicle;
transmit, by the third vehicle, to one or more infrastructure elements that are within the second radius of the third vehicle, a first vehicle-to-infrastructure ("V2I") communication between the third vehicle and the one or more infrastructure elements requesting image files; and
receive, by the third vehicle and from the one or more infrastructure elements, a second V2I communication between the third vehicle and the one or more infrastructure elements comprising the requested image files.

6. The driving analysis computing device of claim 5, the memory unit storing computer-executable instructions, which when executed by the one or more processors, further cause the driving analysis computing device to:
receive, from the third vehicle and via a fifth V2V communication between the first vehicle and the third vehicle, the image files.

7. The driving analysis computing device of claim 6, the memory unit storing computer-executable instructions, which when executed by the one or more processors, further cause the driving analysis computing device to:
transmit the image files received from the third vehicle to a server.

8. A method comprising:
detecting, by a driving analysis computing device installed in a first vehicle, a collision between the first vehicle and a second vehicle;
retrieving, by the driving analysis computing device, first vehicle driving data collected by first vehicle operation sensors within the first vehicle;
receiving, by the driving analysis computing device and from the second vehicle, second vehicle driving data collected by second vehicle operations sensors within the second vehicle;
transmitting, by the driving analysis computing device and to a third vehicle within a first radius of the first vehicle, a first request for vehicle driving data collected by third vehicle operation sensors within the third vehicle, wherein the first request is transmitted via a first vehicle-to-vehicle (V2V) communication between the first vehicle and the third vehicle;
receiving, by the driving analysis computing device and from the third vehicle, a second V2V communication comprising third vehicle driving data collected by the third vehicle operation sensors within the third vehicle;
transmitting, from the first vehicle and to the third vehicle, a third V2V communication comprising a second request for vehicle driving data for one or more vehicles that are within a second radius of the third vehicle; and
receiving, by the driving analysis computing device and from the third vehicle, and in response to the third V2V communication, fourth vehicle driving data collected by fourth vehicle operations sensors within a fourth vehicle that is within the second radius of the third vehicle, wherein the fourth vehicle driving data is sent by the fourth vehicle to the third vehicle; and transmitting, by the driving analysis computing device and to a server, the first vehicle driving data, the second vehicle driving data, the third vehicle driving data, and the fourth vehicle driving data.

9. The method of claim 8, wherein the fourth vehicle driving data is received via a fourth V2V communication between the first vehicle and the third vehicle.

10. The method of claim 8, further comprising:
transmitting the first vehicle driving data, the second vehicle driving data, the third vehicle driving data, and the fourth vehicle driving data to the server via a telematics device.

11. The method of claim 8, further comprising:
determining a time frame associated with the collision between the first vehicle and the second vehicle;
transmitting, to one or more infrastructure elements within a second radius of the first vehicle, and via a first vehicle-to-infrastructure ("V2I") communication between the first vehicle and the one or more infrastructure elements, a request for image files for the time frame;
receiving, from one or more infrastructure elements and via a second V2I communication between the first vehicle and the one or more infrastructure elements, image files associated with the time frame;
tagging the image files with a collision identification number associated with the collision between the first vehicle and the second vehicle; and
transmitting the tagged image files to the server.

12. The method of claim 8, further comprising:
transmit, to the third vehicle and via a fourth V2V communication between the first vehicle and the third vehicle, a request for image files from infrastructure elements that are within a second radius of the third vehicle;
transmit, by the third vehicle, to one or more infrastructure elements that are within the second radius of the third vehicle, a first vehicle-to-infrastructure ("V2I") communication between the third vehicle and the one or more infrastructure elements, the first V2I communication requesting image files; and
receiving, by the third vehicle and from the one or more infrastructure elements, a second V2I communication between the third vehicle and the one or more infrastructure elements, the second V2I communication comprising the requested image files.

13. The method of claim 12, further comprising:
receiving, from the third vehicle and via a fifth V2V communication between the first vehicle and the third vehicle, the image files.

14. The driving analysis computing device of claim 13, further comprising:
transmit the image files received from the third vehicle to the server.

15. A system comprising:
a driving analysis computing device installed within a first vehicle; and
a second vehicle, wherein the driving analysis computing device is configured to:
detect a collision between the first vehicle and the second vehicle;
retrieve first vehicle driving data collected by first vehicle operation sensors within the first vehicle;
receive, from the second vehicle, second vehicle driving data collected by second vehicle operations sensors within the second vehicle;
transmit, to a third vehicle within a first radius of the first vehicle and via a first (V2V) communications between the first vehicle and the third vehicle, a first request for vehicle driving data collected by third vehicle operation sensors within the third vehicle;
receive, from the third vehicle and via a second V2V communication between the first vehicle and the third vehicle, third vehicle driving data collected by the third vehicle operation sensors within the third vehicle;
transmit, from the first vehicle and to the third vehicle, a third V2V communication comprising a second request for vehicle driving data for one or more vehicles that are within a second radius of the third vehicle; and
receive, from the third vehicle and in response to the third V2V communication comprising the second request for vehicle driving data, fourth vehicle driving data collected by fourth vehicle operations sensors within a fourth vehicle that is within the second radius of the third vehicle, wherein the fourth vehicle driving data is sent by the fourth vehicle to the third vehicle; and
transmit the first vehicle driving data, the second vehicle driving data, the third vehicle driving data, and the fourth vehicle driving data, to a server.

16. The system of claim 15, wherein the driving analysis computing device is further configured to receive the fourth vehicle driving data via a fourth V2V communication between the first vehicle and the third vehicle.

17. The system of claim 15, wherein the driving analysis computing device is further configured to transmit first vehicle driving data, the second vehicle driving data, the third vehicle driving data, and the fourth vehicle driving data to the server via a telematics device.

18. The system of claim 15, wherein the driving analysis computing device is further configured to:
determine a time frame associated with the collision between the first vehicle and the second vehicle;
transmit, to one or more infrastructure elements within a second radius of the first vehicle, and via a first vehicle-to-infrastructure ("V2I") communication between the first vehicle and the one or more infrastructure elements, a request for image files for the time frame;
receive, from one or more infrastructure elements and via a second V2I communication between the first vehicle and the one or more infrastructure elements, image files associated with the time frame;
tag the image files with a collision identification number associated with the collision between the first vehicle and the second vehicle; and
transmit the tagged image files to the server.

* * * * *